US012335697B2

(12) United States Patent
Veselinovic et al.

(10) Patent No.: US 12,335,697 B2
(45) Date of Patent: Jun. 17, 2025

(54) SYSTEM AND METHOD FOR AUTOMATIC SETUP OF AUDIO COVERAGE AREA

(71) Applicant: Shure Acquisition Holdings, Inc., Niles, IL (US)

(72) Inventors: Dusan Veselinovic, Chicago, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 262 days.

(21) Appl. No.: 18/151,346

(22) Filed: Jan. 6, 2023

(65) Prior Publication Data

US 2023/0224636 A1 Jul. 13, 2023

Related U.S. Application Data

(60) Provisional application No. 63/266,553, filed on Jan. 7, 2022.

(51) Int. Cl.

| | |
|---|---|
| ***H04R 3/00*** | (2006.01) |
| ***H04R 1/40*** | (2006.01) |
| ***H04R 29/00*** | (2006.01) |

(52) U.S. Cl.

CPC ............. *H04R 3/005* (2013.01); *H04R 1/406* (2013.01); *H04R 29/005* (2013.01); *H04R 2201/401* (2013.01)

(58) Field of Classification Search

CPC ...... H04R 3/005; H04R 1/406; H04R 29/005; H04R 2201/401

(Continued)

(56) References Cited

U.S. PATENT DOCUMENTS

| | | | |
|---|---|---|---|
| 7,221,622 | B2 | 5/2007 | Matsuo |
| 7,558,156 | B2 | 7/2009 | Vook |

(Continued)

FOREIGN PATENT DOCUMENTS

| | | |
|---|---|---|
| CN | 107018470 | 8/2017 |
| CN | 107018476 | 8/2017 |

(Continued)

OTHER PUBLICATIONS

Lam, "3D Sound-Source Localization Using Triangulation-Based Methods," Thesis submitted to the University of British Columbia, Nov. 2017, 120 pp.

(Continued)

*Primary Examiner* — Vivian C Chin
*Assistant Examiner* — Douglas J Suthers
(74) *Attorney, Agent, or Firm* — Neal, Gerber & Eisenberg LLP

(57) ABSTRACT

Embodiments include an audio system comprising a plurality of microphones disposed in an environment, wherein the plurality of microphones is configured to detect one or more audio sources, and generate location data indicating a location of each of the one or more audio sources relative to the plurality of microphones; and at least one processor communicatively coupled to the plurality of microphones, wherein the at least one processor is configured to receive the location data from the plurality of microphones, and define a plurality of audio pick-up regions in the environment based on the location data, the plurality of audio pick-up regions comprising a first audio pick-up region and a second audio pick-up region, wherein the plurality of microphones are configured to deploy a first lobe within the first audio pick-up region and a second lobe within the second audio pick-up region.

20 Claims, 16 Drawing Sheets

(58) Field of Classification Search
USPC ........................................................... 381/58
See application file for complete search history.

(56) References Cited

U.S. PATENT DOCUMENTS

| | | | |
|---|---|---|---|
| 7,684,578 | B2 | 3/2010 | Roeder |
| 8,111,583 | B2 | 2/2012 | Schwartz |
| 8,306,236 | B2 | 11/2012 | Asada |
| 8,363,848 | B2 | 1/2013 | Huang |
| 8,983,089 | B1 | 3/2015 | Chu |
| 9,042,563 | B1 | 5/2015 | Beaty |
| 9,129,223 | B1 | 9/2015 | Velusamy |
| 9,338,549 | B2 | 5/2016 | Haulick |
| 9,392,088 | B2 | 7/2016 | Strazisar |
| 9,396,731 | B2 | 7/2016 | Herre |
| 9,426,598 | B2 | 8/2016 | Walsh |
| 9,538,156 | B2 | 1/2017 | Densham |
| 9,633,645 | B2 | 4/2017 | Wurm |
| 9,711,131 | B2 | 7/2017 | Christoph |
| 9,716,946 | B2 | 7/2017 | Goshen |
| 9,826,311 | B2 | 11/2017 | Hansson |
| 9,877,133 | B2 | 1/2018 | Katagiri |
| 9,881,619 | B2 | 1/2018 | Erik |
| 10,433,086 | B1 | 10/2019 | Juszkiewicz |
| 10,448,193 | B2 | 10/2019 | Van Laack |
| 10,477,310 | B2 | 11/2019 | Salehin |
| 10,492,015 | B2 | 11/2019 | Kim |
| 10,511,927 | B2 | 12/2019 | Kitazawa |
| 10,547,961 | B2 | 1/2020 | Kitazawa |
| 10,595,122 | B2 | 3/2020 | Lin |
| 10,741,193 | B1 | 8/2020 | McCowan |
| 11,032,663 | B2 | 6/2021 | Choueiri |
| 2006/0262942 | A1 | 11/2006 | Oxford |
| 2011/0135125 | A1 | 6/2011 | Zhan |
| 2015/0156578 | A1 | 6/2015 | Alexandridis |
| 2017/0070822 | A1 | 3/2017 | Skovenborg |
| 2017/0188170 | A1 | 6/2017 | Prins |
| 2020/0322719 | A1* | 10/2020 | McCowan ............. H04R 1/406 |
| 2020/0342887 | A1 | 10/2020 | Xu |
| 2021/0058702 | A1 | 2/2021 | Shumard |
| 2021/0112336 | A1 | 4/2021 | Chen |

FOREIGN PATENT DOCUMENTS

| | | |
|---|---|---|
| CN | 108107407 | 6/2018 |
| CN | 110446142 | 11/2019 |
| DE | 102008017001 | 7/2009 |
| GB | 1497991 | 1/1978 |
| JP | H07218614 | 8/1995 |
| JP | 2017028494 | 2/2017 |
| KR | 101168743 | 7/2012 |
| WO | 2017039632 | 3/2017 |
| WO | 2018210429 | 11/2018 |

OTHER PUBLICATIONS

Liu, "Arbitrary Microphone Array Optimization Method Based on TDOA for Specific Localization Scenarios," Sensors 2019, 19;4326, 22 pp.

P300 IntelliMix Audio Conferencing Processor, Manual, Shure Incorporated, 2021, 48 pp.

Rascon, et al., "Localization of sound sources in robotics: A review," Robotics and Autonomous Systems 96, 2017, 184 pp.

TeamConnect Ceiling 2, Brochure, Sennheiser electronic GmbH & Co. KG, 2023, 9 pp.

Yorga, "R&D Stories: The Impact of Acoustic Spatial Resolution in a 3D Space," Audio Xpress; Feb. 4, 2021; 19 pp.

International Search Report and Written Opinion for PCT/US2023/060265 dated Apr. 6, 2023, 15 pp.

* cited by examiner

SYSTEM AND METHOD FOR AUTOMATIC SETUP OF AUDIO COVERAGE AREA

CROSS-REFERENCE

This application claims priority to U.S. Provisional Patent Application No. 63/266,553, filed on Jan. 7, 2022, the entirety of which is incorporated by reference herein.

TECHNICAL FIELD

This disclosure generally relates to an audio system located in a conference room or other conferencing environment. More specifically, this disclosure relates to automatically configuring audio coverage areas of the audio system within the conferencing environment.

BACKGROUND

Conferencing environments, such as conference rooms, boardrooms, video conferencing settings, and the like, typically involve the use of microphones for capturing sound from various audio sources active in such environments. Such audio sources may include human participants of a conference call, for example, that are producing speech, music and other sounds. The captured sound may be disseminated to a local audience in the environment through amplified speakers (for sound reinforcement), and/or to others remote from the environment (such as, e.g., a via a telecast and/or webcast) using communication hardware. The conferencing environment may also include one or more loudspeakers or audio reproduction devices for playing out loud audio signals received, via the communication hardware, from the remote participants, or human speakers that are not located in the same room. These and other components of a given conferencing environment may be included in one or more conferencing devices and/or operate as part of an audio system.

In general, conferencing devices are available in a variety of sizes, form factors, mounting options, and wiring options to suit the needs of particular environments. The types of conferencing devices, their operational characteristics (e.g., lobe direction, gain, etc.), and their placement in a particular conferencing environment may depend on a number of factors, including, for example, the locations of the audio sources, locations of listeners, physical space requirements, aesthetics, room layout, and/or other considerations. For example, in some environments, a conferencing device may be placed on a table or lectern to be near the audio sources and/or listeners. In other environments, a conferencing device may be mounted overhead or on a wall to capture the sound from, or project sound towards, the entire room, for example.

Typically, a system designer or other professional installer installs an audio system in a given environment or room by manually connecting, testing, and configuring each piece of equipment to ensure optimal performance of the overall system. As an example, when installing microphones, the installer ensures optimal audio coverage of the environment by delineating “audio coverage areas,” which represent the regions in the environment that are designated for capturing audio signals, such as, e.g., speech produced by human speakers. These audio coverage areas then define the spaces where lobes can be deployed by the microphones. A given environment or room can include one or more audio coverage areas, depending on the size, shape, and type of environment. For example, the audio coverage area for a typical conference room may include the seating areas around a conference table, while the audio coverage area for a typical classroom may include the space around a blackboard and/or podium at the front of the room.

Accordingly, there is still a need for an audio system that can be optimally configured and maintained with minimal setup time, cost, and manual effort.

SUMMARY

The invention is intended to solve the above-noted and other problems by providing systems and methods that are designed to, among other things: (1) automatically configure audio coverage areas (or “audio pick-up regions”) for an environment using location data obtained over time from one or more audio devices positioned within the environment, (2) dynamically adapt the audio coverage areas as new location data is received, and (3) automatically determine a position of a given audio device relative to another audio device using time-synchronized location data obtained from both audio devices.

One exemplary embodiment includes an audio system comprising: a plurality of microphones disposed in an environment, the plurality of microphones comprising a first subset of microphones and a second subset of microphones, wherein the first subset of microphones is configured to detect one or more audio sources, and generate first location data indicating a location of each of the one or more audio sources relative to the first subset of microphones, and the second subset of microphones is configured to detect the one or more audio sources, and generate second location data indicating the location of each of the one or more audio sources relative to the second subset of microphones; and at least one processor communicatively coupled to the plurality of microphones, wherein the at least one processor is configured to: receive the first location data and the second location data from the plurality of microphones; define a plurality of audio pick-up regions in the environment based on the first location data and the second location data, the plurality of audio pick-up regions comprising a first audio pick-up region and a second audio pick-up region; assign the first audio pick-up region to the first subset of microphones based on a proximity of the first subset of microphones to the first audio pick-up region, the first subset of microphones being configured to deploy a first lobe within the first audio pick-up region; and assign the second audio pick-up region to the second subset of microphones based on a proximity of the second subset of microphones to the second audio pick-up region, the second subset of microphones being configured to deploy a second lobe within the second audio pick-up region.

According to certain aspects, the first subset of microphones is disposed in a first microphone array and the second subset of microphones is disposed in a second microphone array. According to further aspects, the at least one processor is further configured to: receive, from each of the first microphone array and the second microphone array, a timestamp with each set of coordinates included in the first location data and the second location data; based on the timestamp received for each set of coordinates included in the first location data and the second location data, identify a first set of coordinates received from the first microphone array and corresponding to a first point in time, and a second set of coordinates received from the second microphone array and corresponding to the first point in time, wherein the first set of coordinates is located in a first coordinate system associated with the first microphone array, and the second set of coordinates is located in a second coordinate system associated with the second microphone array; apply a transform function to the second set of coordinates, the transform function configured to transform the second set of coordinates into a transformed second set of coordinates located in the first coordinate system; and determine a location of the second microphone array relative to the first microphone array based on the transformed second set of coordinates. According to some aspects, the at least one processor is further configured to determine, based on the relative location of the second microphone array, the proximity of the second microphone array to the second audio pick-up region. According to some aspects, the at least one processor is further configured to calculate the transform function based on the first set of coordinates and the second set of coordinates. According to some aspects, the at least one processor is further configured to determine a location of a first one of the one or more audio sources relative to the first microphone array based on the first set of coordinates and the transformed second set of coordinates.

Another exemplary embodiment includes a method of automatically configuring audio coverage for an environment having a plurality of microphones communicatively coupled to at least one processor, the plurality of microphones including a first subset of microphones and a second subset of microphones, the method comprising: receiving, with at least one processor, first location data from the first subset of microphones, the first location data indicating a location of each of one or more audio sources relative to the first subset of microphones; receiving, with at least one processor, second location data from the second subset of microphones, the second location data indicating the location of each of the one or more audio sources relative to the second subset of microphones; defining, with the at least one processor, a plurality of audio pick-up regions in the environment based on the first location data and the second location data, the plurality of audio pick-up regions comprising a first audio pick-up region and a second audio pick-up region; assigning, with the at least one processor, the first audio pick-up region to the first subset of microphones based on a proximity of the first subset of microphones to the first audio pick-up region, the first subset of microphones being configured to deploy a first lobe within the first audio pick-up region; and assigning, with the at least one processor, the second audio pick-up region to the second subset of microphones based on a proximity of the second subset of microphones to the second audio pick-up region, the second subset of microphones being configured to deploy a second lobe within the second audio pick-up region.

According to certain aspects, the first subset of microphones is disposed in a first microphone array and the second subset of microphones is disposed in a second microphone array. According to further aspects, the method further comprises receiving, with the at least one processor, a timestamp with each set of coordinates included in the first location data and the second location data; based on the timestamp received for each set of coordinates in the first location data and the second location data, identifying, with the at least one processor, a first set of coordinates received from the first microphone array and corresponding to a first point in time, and a second set of coordinates received from the second microphone array and corresponding to the first point in time, wherein the first set of coordinates are located in a first coordinate system associated with the first microphone array, and the second set of coordinates are located in a second coordinate system associated with the second microphone array; applying, with the at least one processor, a transform function to the second set of coordinates, the transform function configured to transform the second set of coordinates into a transformed second set of coordinates located in the first coordinate system; and determining, with the at least one processor, a location of the second microphone array relative to the first microphone array based on the transformed second set of coordinates. According to some aspects, the method further comprises determining, with the at least one processor, the proximity of the second microphone array to the second audio pick-up region based on the relative location of the second microphone array. According to some aspects the method further comprises calculating the transform function based on the first set of coordinates and the second set of coordinates. According to some aspects, the method further comprises determining a location of a first one of the one or more audio sources relative to the first microphone array based on the first set of coordinates and the transformed second set of coordinates.

Another exemplary embodiment includes an audio system comprising a plurality of microphones disposed in an environment, wherein the plurality of microphones is configured to detect one or more audio sources, and generate location data indicating a location of each of the one or more audio sources relative to the plurality of microphones; and at least one processor communicatively coupled to the plurality of microphones, wherein the at least one processor is configured to receive the location data from the plurality of microphones, and define a plurality of audio pick-up regions in the environment based on the location data, the plurality of audio pick-up regions comprising a first audio pick-up region and a second audio pick-up region, wherein the plurality of microphones are configured to deploy a first lobe within the first audio pick-up region and a second lobe within the second audio pick-up region.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
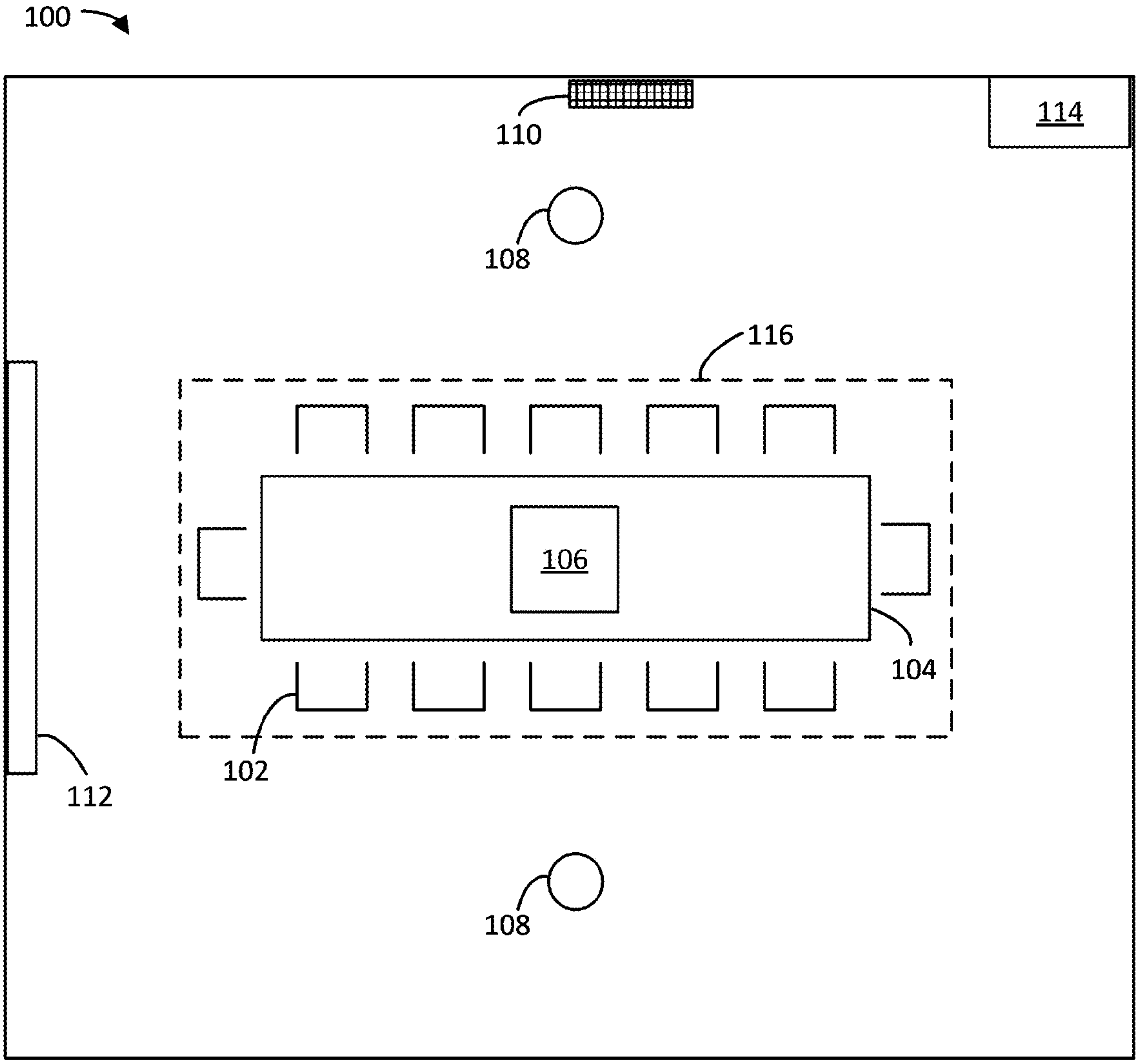
FIG. 1 is a block diagram illustrating an exemplary conferencing environment with a single audio pick-up region, in accordance with one or more embodiments.

Existing techniques for setting up audio coverage areas involve complex, manual tasks. For example, the installer must first determine the exact geometry of the environment and the precise locations of all audio sources therein, including each microphone and loudspeaker in the environment and the anticipated positions of all talkers or human speakers. Typically, the installer obtains this information manually, for example, by taking measurements throughout the room. Next, the installer manually positions or points microphone lobes towards locations where talkers are expected to be in a room (e.g., the seats around a conference tables), adjusts a beam width of each lobe depending on how many talkers are expected to be in the corresponding area (e.g., narrow for single talkers, or medium or wide to cover multiple talkers by a single lobe), tests each lobe for sufficient clarity and presence and a smooth sound level across the entire lobe (e.g., by sitting in the area and talking while listening to the mixed output via headphones), and confirms that only the expected lobe gates on when talkers are seated in correct positions. These steps may need to be repeated after the initial configurations are complete, for example, in order to adapt to changes in room layout, seated locations, audio connections, and other factors, as these changing circumstances may cause the audio system to become sub-optimal over time.

Systems and methods are provided herein for automatically defining and configuring one or more audio coverage areas for an environment to optimally capture audio sources in the environment using a plurality of microphones. The plurality of microphones may be microphone elements or transducers included in a single microphone array, in a plurality of microphone arrays, and/or in one or more other audio devices. Each audio coverage area defines a region in which a given microphone array, or other audio input device, is able to deploy lobes for picking up sound from the audio sources. In some embodiments that include multiple audio coverage areas, the audio coverage areas can be adjacent regions configured to cover the audio sources without overlapping with each other. In embodiments that include multiple microphone arrays, each audio coverage area can be assigned to a specific microphone array, for example, depending on proximity to the audio source. In some embodiments, the audio coverage areas can be used to establish sound zones for voice-lift or other sound reinforcement applications. The plurality of microphones may be part of a larger audio system that is used to facilitate a conferencing operation (such as, e.g., a conference call, telecast, webcast, etc.) or other audio/visual event. The audio system may be configured as an ecosystem comprised of a plurality of audio devices and a computing device that is in communication with each of the audio devices, for example, using a common communication protocol. The audio devices in the audio system may include the plurality of microphones, at least one speaker, and/or one or more conferencing devices. In various embodiments, the computing device comprises at least one processor configured to automatically define the one or more audio coverage areas for the environment using location data (e.g., sound localization data) obtained over time from two or more of the microphones in the audio system. In some embodiments, the at least one processor is also configured to dynamically adapt or reconfigure the audio coverage areas as new location data is received from the audio devices. In some embodiments, the at least one processor is further configured to automatically determine a position of a given audio device in the environment using time-synchronized location data received from the same audio device and at least one other audio device in the environment.

Thus, the above techniques, and others described herein, enable an installer to set up and configure audio coverage areas for a given environment, or room, with minimal effort and increased efficiency. For example, as mentioned above, typical room installation methods require manually setting up the audio coverage areas of a room by measuring the precise location of each microphone in the room, the distance from the microphone to a conference table or chair, and other specifications of the room. Moreover, every time the room layout changes, for example, due to changes in seating and/or table arrangement, the installer must repeat these manual tasks to create new audio coverage areas for the new layout. In contrast, the techniques described herein provide improved audio systems and methods for automatically defining and configuring audio coverage areas for the room, so as to require little to no manual measurements or inputs by the installer. For example, once the audio devices are mounted in the room and connected to the system, the installer need only provide sounds in the intended audio pick-up regions over a period of time and the audio system handles the rest, within a fraction of the time. Specifically, the audio system can detect the provided sounds using its microphones, create a "heat map" of the locations of those sounds over the period of time using localization data obtained from the microphones, and define audio coverage areas for the room based on the sound locations in the heat map, all within a matter of minutes. Furthermore, the techniques described herein can be used to identify and remove any spurious and/or erroneous localization data, or other outliers that may be the result of reverb or other undesirable audio effects in the room, thus improving an accuracy of the audio coverage areas. In addition, the systems and methods described herein can automatically configure the audio coverage areas to avoid noise sources in the room and/or loudspeakers used to play far-end audio or other audio signals within the room, thus improving audio performance and acoustic echo cancellation operation of the audio system. Moreover, since little to no manual measurements are required, the techniques described herein can be used to automatically reconfigure or adjust the audio coverage areas as the locations of the audio sources, and/or noise sources, change over time, for example, due to movement of the microphones or other audio devices, changes in room configuration (e.g., re-arrangement of seating, tables, podiums, and other furniture), and the like.

Figure 2:
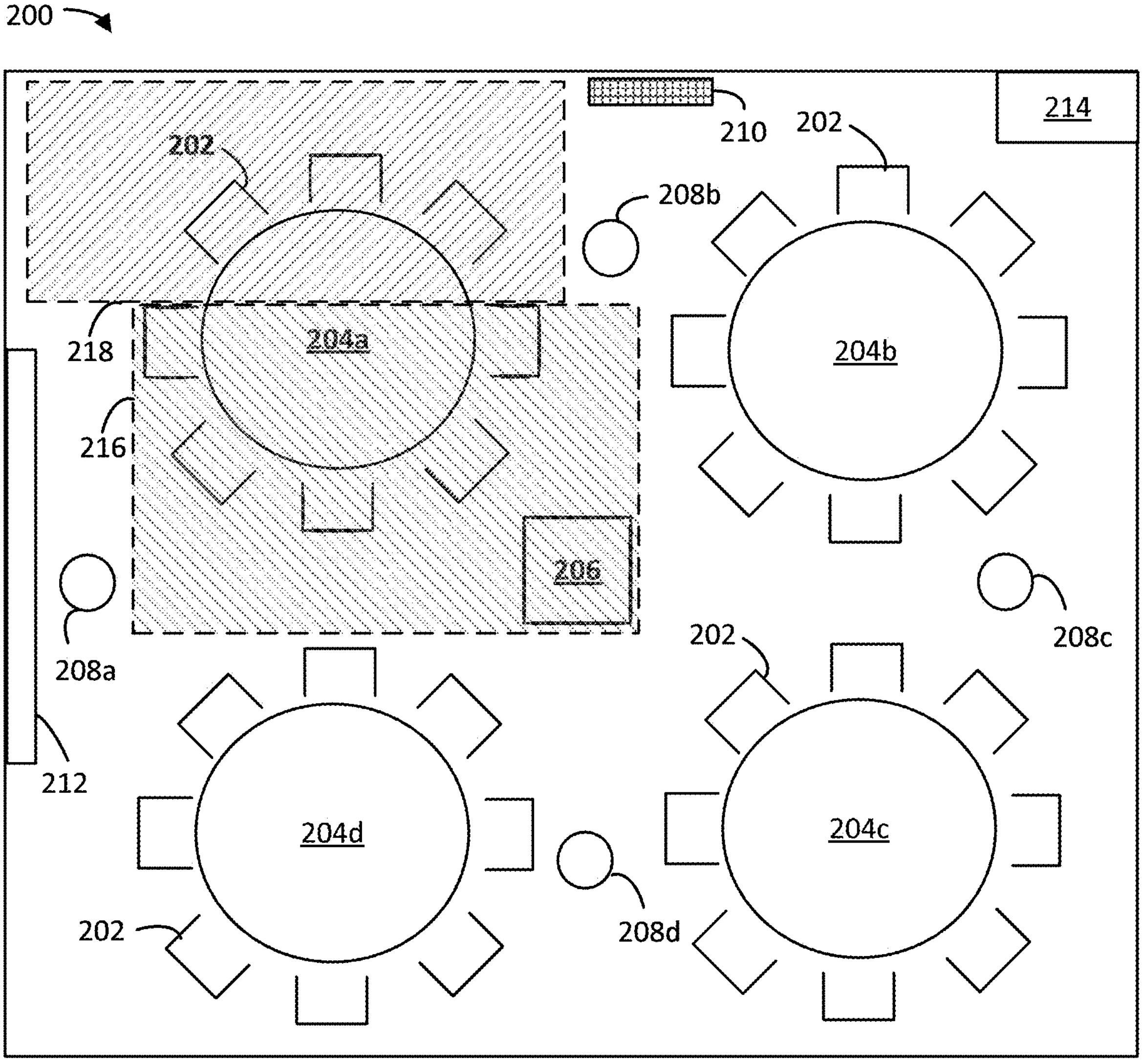
FIG. 2 is a block diagram illustrating another exemplary environment with two audio pick-up regions, in accordance with one or more embodiments.
Figure 3:
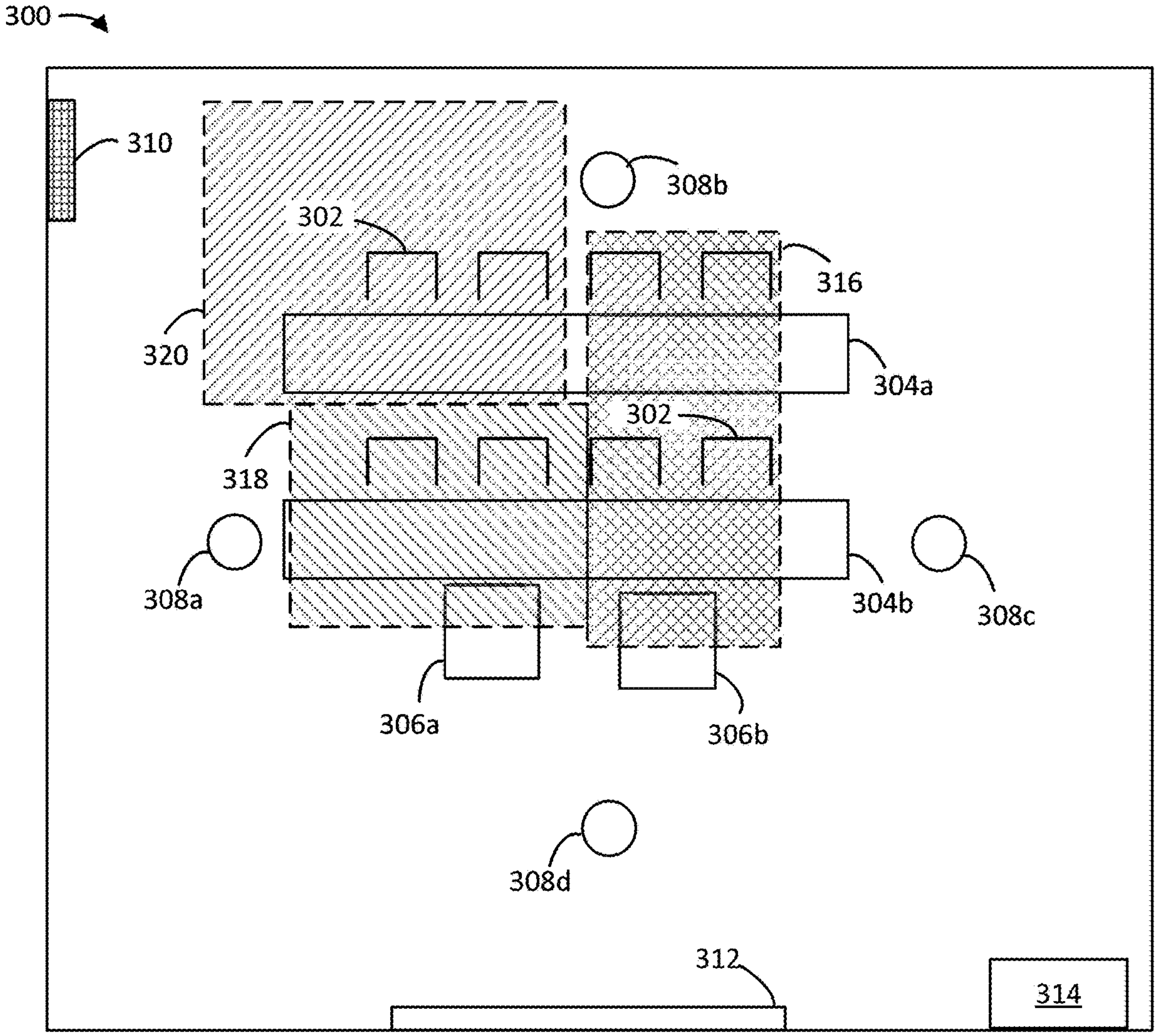
FIG. 3 is a block diagram illustrating another exemplary environment with three audio pick-up regions, in accordance with one or more embodiments.

Referring now to FIGS. 1 to 3, shown are exemplary environments (e.g., conference rooms, classrooms, spaces, etc.) in which one or more techniques for automatically configuring audio coverage areas to optimally capture audio sources located in said environment may be used, in accordance with embodiments. While FIGS. 1-3 show specific room configurations, it should be appreciated that other arrangements of the audio sources are contemplated and possible, including, for example, audio sources that move about the room and different arrangements of the chairs and/or table(s).

Starting with FIG. 1, shown is an exemplary conferencing environment 100, in according with embodiments. The conferencing environment 100 may be a conference room, a boardroom, a classroom, or other meeting room or space where the audio sources include one or more human speakers or talkers participating in a conference call, telecast, webcast, class, seminar, or other meeting or event. The audio sources may be seated in respective chairs 102 disposed around a table 104, as shown in FIG. 1.

The conferencing environment 100 further includes a plurality of microphones 106 for detecting and capturing sound from the audio sources, such as, for example, speech spoken by the human speakers situated in the conferencing environment 100 (e.g., near-end conference participants seated around the table 104), music or other sounds generated by the human speakers, and other near-end sounds associated with the conferencing event. In some embodiments, all or some of the microphones 106 may be disposed in a single microphone array or other audio device, for example, as shown in FIG. 1. In other embodiments, all or some of the microphones 106 may be disposed in two or more microphone arrays or other audio devices (e.g., as shown in FIG. 3). The conferencing environment 100 also includes one or more loudspeakers 108 for playing or broadcasting far-end audio signals received from audio sources that are not present in the conferencing environment 100 (e.g., remote conference participants connected to the conferencing event through third-party conferencing software) and other far-end audio signals associated with the conferencing event. The loudspeakers 108 may be disposed at various locations around the environment 100, as shown in FIG. 1. In embodiments, the plurality of microphones 106 and the one or more loudspeakers 108 may be attached to a wall, attached to the ceiling (e.g., as shown in FIG. 1), or placed on one or more other surfaces within the environment 100, such as, for example, the table 104, a lectern or podium, a desk or other table top, and the like.

Other sounds may also be present in the environment 100 which may be undesirable, such as noise from ventilation, other persons, audio/visual equipment, electronic devices, etc. For example, FIG. 1 shows a noise source 110 located on one side of the environment 100 that may be a heating, ventilation, and air-conditioning (HVAC) unit or vent.

The conferencing environment 100 can also include a presentation unit 112 for displaying video, images, or other content associated with the conferencing event, such as, for example, a live video feed of the remote conference participants, a document being presented or shared by one of the participants, a video or film being played as part of the event, etc. In some embodiments, the presentation unit 112 may be a smart board or other interactive display unit. In other embodiments, the presentation unit 112 may be a television, computer monitor, or any other suitable display screen. In still other embodiments, the presentation unit 112 may be a chalkboard, whiteboard, or the like. The presentation unit 112 may be attached to one of the walls, as shown in FIG. 1, attached to the ceiling, or placed on one or more other surfaces within the environment 100, such as, for example, the table 104, a lectern, a desk or other table top, and the like.

Figure 6:
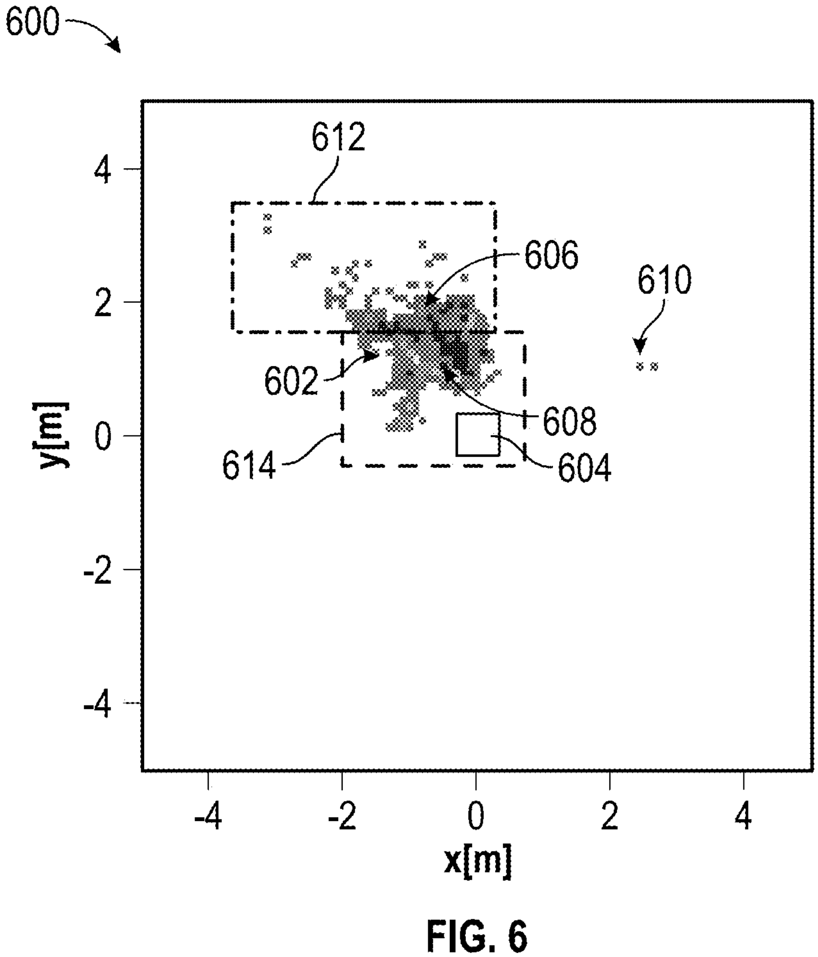
FIG. 6 is a plot of location data obtained for a first environment, in accordance with one or more embodiments.

As illustrated in FIG. 1, the conferencing environment 100 may further include a computing device 114 for enabling a conferencing call or otherwise implementing one or more aspects of the conferencing event. The computing device 114 can be any generic computing device comprising a processor and a memory device (e.g., as shown in FIG. 6). In embodiments, the plurality of microphones 106 and the one or more speakers 108 (collectively referred to herein as "audio devices"), as well as one or more other components of the conferencing environment 100 (such as, e.g., the presentation unit 112) may be connected or coupled to the computing device 114 via a wired connection (e.g., Ethernet cable, USB cable, etc.) or a wireless network connection (e.g., WiFi, Bluetooth, Near Field Communication ("NFC"), RFID, infrared, etc.). For example, in some embodiments, one or more of the microphones 106 and speaker(s) 108 may be network audio devices coupled to the computing device 114 via a network cable (e.g., Ethernet) and configured to handle digital audio signals. In other embodiments, the audio devices may be analog audio devices or another type of digital audio device and may be connected to the computing device 114 using a Universal Serial Bus (USB) cable or other suitable connection mechanism.

Though not shown, in various embodiments, one or more components of the environment 100 may be combined into one device. For example, in some embodiments, at least one of the microphones 106 and at least one of the speakers 108 may be included in a single device, such as, e.g., a conferencing device or other audio hardware. As another example, in some embodiments, at least one of the speakers 108 and/or at least one of the microphones 106 may be included in the presentation unit 112. In some embodiments, at least one of the microphones 106 and at least one of the speakers 108 may be included in the computing device 114, for example, as native microphone(s) and/or speaker(s) of the computing device 114. It should be appreciated that the conferencing environment 100 may include other devices not shown in FIG. 1, such as, for example, one or more sensors (e.g., motion sensor, infrared sensor, etc.), a video camera, etc.

In embodiments, the computing device 114, the plurality of microphones 106, and the one or more speakers 108 form an audio system (such as, e.g., audio system 400 shown in FIG. 4) that is configured to automatically set up one or more audio coverage areas for optimally capturing audio sources in the conferencing environment 100. Each audio coverage area (also referred to herein as "audio pick-up region") represents a region or space within which one or more of the microphones 106 can deploy lobes for capturing or detecting audio. The audio system may identify these regions by determining where the audio sources are located, or expected to be located, whether seated, standing, or moving about within the environment 100. For example, as shown in FIG. 1, the audio system may define an audio coverage area 116 for the environment 100 that extends around, or encompasses, each of the chairs 102 and the table 104, based on a determination that the audio sources are seated at or near the chairs 102, or otherwise present around the table.

The audio system may reach the above determination using the plurality of microphones 106 and the computing device 114. For example, the plurality of microphones 106 can be configured to detect one or more of the audio sources and generate location data (also referred to as "sound localization data") that indicates a position of each audio source relative to the microphones 106. In embodiments, the microphones 106 may include localization software (e.g., localization module 422 shown in FIG. 4) or other algorithm configured to use a subset of at least two microphones 106 to generate a localization of a detected sound or other audio source and determine coordinates (also referred to herein as "localization coordinates") that represent a location or position of the detected audio source, relative to the plurality of microphones 106 (or the microphone array in which the microphones 106 are located). Various methods for generating sound localizations are known in the art, including, for example, generalized cross-correlation ("GCC") and others.

According to various embodiments, the localization coordinates may be Cartesian or rectangular coordinates that represent a location point in three dimensions, or x, y, and z values. For example, the location data may include a first set of coordinates (x1, y1, z1) that represents a location of a first audio source relative to a first subset of the microphones 106 (e.g., two or more microphones included within a given microphone array or other audio device) and a second set of coordinates (x2, y2, z2) that represents a location of the first audio source relative to a second subset of the microphones 106 (e.g., two or more other microphones included within the same microphone array or in a second microphone array or other audio input device). In some cases, the localization coordinates may be converted to polar or spherical coordinates, i.e. azimuth (phi), elevation (theta), and radius (r), for example, using a transformation formula, as is known in the art. The spherical coordinates may be used in various embodiments to determine additional information about the audio system, such as, for example, a distance between the audio source and a given microphone array and/or a distance between two microphone arrays (e.g., as described herein with respect to FIG. 8). Such distance information may be used to automatically configure an audio coverage area, as described herein with respect to FIG. 5, for example.

In some embodiments, the location data also includes a timestamp or other timing information that indicates the time at which each set of coordinates was generated by the microphones 106, an order in which the coordinates were generated, and/or any other information that helps identify coordinates that were generated simultaneously, or nearly simultaneously, for the same audio source. In some embodiments, the microphones 106 may have synchronized clocks (e.g., using Network Time protocol or the like). In other embodiments, the timing, or simultaneous output, of the coordinates may be determined using other techniques, such as, for example, setting up a time-synchronized data channel for transmitting the localization coordinates from the microphones 106 to the computing device 114 and more.

Figure 7:
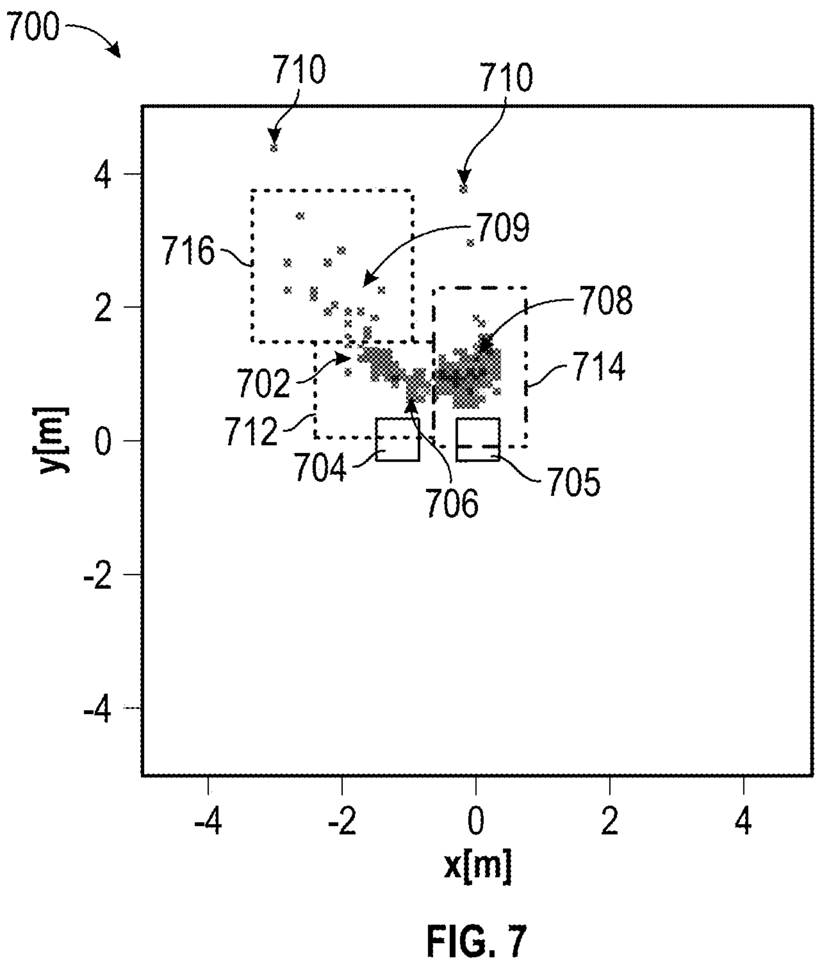
FIG. 7 is a plot of location data obtained for a second environment, in accordance with one or more embodiments.

The computing device 114 can be configured to aggregate or receive the location data from the plurality of microphones 106 over a period of time, and define the audio coverage area 116 based on the received location data. In particular, the computing device 114 can be configured to perform various techniques to identify localization coordinates corresponding to the detected audio sources within the location data, identify one or more clusters, or groupings of closely-adjacent localization coordinates, for example, using a heat map of the localization coordinates (e.g., as shown in FIGS. 6 and 7) and/or a clustering algorithm, and form or define a respective audio coverage area around each cluster, as described below in more detail with respect to FIG. 5. In addition, the computing device 114 can be configured to select an overall size and shape of the audio coverage area according to a size and shape of the corresponding cluster, in order to ensure a more complete coverage of the audio sources. In some embodiments, the computing device 114 can be further configured to define, or configure, the size and shape of the audio coverage area according to general shape requirements for audio coverage areas, such as, e.g., a requirement for each area to be shaped as a square, rectangle, circle, oval, triangle, hexagon or other polygon, or any other shape, and/or other constraints of the audio system that are designed to allow for better control of the area (e.g., a specific amount of gain, mute/unmute controls, etc.) and optimal audio performance.

Upon applying these techniques to the environment 100, for example, the computing device 114 may define the audio coverage area 116 shown in FIG. 1 as a rectangle that extends around the chairs 102 and table 104 after identifying a single cluster of localization coordinates that is centered on the table 104 and extends to or towards each of the chairs 102, and based further on a rectangular shape requirement for audio coverage areas. The resulting audio coverage area 116 thus creates a sound zone that focuses audio pick-up on the human speakers or other audio sources located at or near the chairs 102 and the table 104. In this manner, the audio system of the conferencing environment 100 can be configured to automatically provide appropriate audio coverage of the audio sources disposed around the table 104.

Once the audio coverage area 116 is defined and refined, the audio system may transition from an adaptation (or set-up) phase to a usage phase. In the usage phase, the audio system may set or implement the audio coverage area 116 by deploying microphone lobes in the region defined by the audio coverage area 116. For example, in some embodiments, the computing device 114 may be configured to instruct or cause the plurality of microphones 106 to deploy appropriate lobes in the audio coverage area 116. In other embodiments, the computing device 114 may send information about the audio coverage area 116 (e.g., information describing or defining the boundaries of the area 116) to the audio device(s) that include the microphones 106, and the audio device(s) can be configured to deploy the appropriate microphone lobes within the audio coverage area 116 accordingly. In either case, the microphone lobes may be deployed by providing a set of coordinates that are associated with the desired audio coverage area to a beamformer configured to direct a microphone lobe toward the specified coordinates. In various embodiments, the beamformer may be included in the audio system as part of the computing device 114, as part of one or more of the audio devices that include the microphones 106, as a standalone device that is in communication with the computing device 114 and the microphones 106, or any combination thereof. The beamformer may include any type of beamforming algorithm or other beamforming technology configured to deploy microphone lobes, including, for example, a delay and sum beamforming algorithm, a minimum variance distortionless response ("MVDR") beamforming algorithm, and more.

In some embodiments, implementation of the audio coverage area 116, and corresponding deployment of the appropriate microphone lobes, may occur automatically, for example, once a threshold number of localization points have been collected and analyzed, or other criteria has been met. In other embodiments, the audio system may include a button, switch, touchscreen, or other user input device for enabling a user (or installer) to enter an input for implementing the audio coverage area 116, or otherwise indicate the end of a set-up or adaptation mode and/or the start of a normal use mode of the audio system. As an example, the user input device may be included on the microphone array that includes the microphones 106, in the computing device 114 (e.g., as part of the user interface), or as a standalone device disposed within the environment 100 and communicatively coupled to the audio system.

FIG. 2 illustrates another exemplary environment 200 that may be a meeting room, conference room, classroom, or other event space where the audio sources include one or more human talkers, similar to the conferencing environment 100. As shown, the environment 200 includes a plurality of chairs 202 disposed around a plurality of tables 204*a*, 204*b*, 204*c*, and 204*d* (collectively referred to as "tables 204"). The tables 204 may be located at various places around the environment 200, and the audio sources may be seated in respective chairs 202 at one or more of the tables 204.

The environment 200 also includes multiple components that may be substantially similar to corresponding components of the conferencing environment 100 shown in FIG. 1. For example, the environment 200 includes a plurality of microphones 206 that may be similar to the microphones 106 of FIG. 1. In particular, like the microphones 106, all or some of the microphones 206 may be disposed in a single microphone array, as shown in FIG. 2, or may be disposed in two or more microphone arrays (e.g., as shown in FIG. 3). The environment 200 further includes a plurality of loudspeakers 208*a*, 208*b*, 208*c*, and 208*d* (collectively referred to as "loudspeakers 208") that may be similar to the loudspeakers 108 of FIG. 1. As shown in FIG. 2, the loudspeakers 208 may be disposed at various locations around the environment 200. The environment 200 also includes a noise source 210, similar to the noise source 110 of FIG. 1, and a presentation device 212 that is similar to the presentation device 112 of FIG. 1. Lastly, the environment 200 further includes a computing device 214 that is similar to the computing device 114 of FIG. 1. The computing device 214, the loudspeakers 208, the microphones 206 may form an audio system that is similar to the audio system of FIG. 1. For example, the audio system of the environment 200 may be configured to automatically set up a one or more audio coverage areas for optimally capturing the audio sources in the environment 200, like the audio system of the conferencing environment 100. Accordingly, similar components of the environment 200 will not be described in great detail for the sake of brevity.

As shown in FIG. 2, the audio system of the environment 200 may define two adjacent audio coverage areas 216 and 218 that are configured to optimally capture the audio sources disposed around the table 204 and/or at the chairs 202, based on location data received from the microphones 206 and analyzed by the computing device 214. For example, the computing device 214 may perform various techniques to identify localization coordinates within the location data that correspond to each of the detected audio sources and based thereon, identify a first cluster of adjacent sound localization coordinates positioned at or near a first portion of the table 204*a*, and a second cluster of adjacent sound localization coordinates positioned at or near a second portion of the table 204*a*. In various embodiments, the computing device 214 can be configured to determine the number of clusters to create for a given group of adjacent localization coordinates based on a proximity of the localization coordinates to the detected (or localized) audio source, a distance from the central point of the group to an outer border of the group, a size of the corresponding audio coverage area, and/or any other appropriate factor. For example, in FIG. 2, using these factors, the computing device 214 determined that the coordinates included in the received location data form two clusters spread across the table 204*a*. Based thereon, the computing device 214 may define a first audio coverage area 216 around the first cluster and a second audio coverage area 218 around the second cluster, thus creating two sound zones to focus audio pick-up on two different, but adjacent regions of the table 204*a*.

Moreover, like the computing device 114, the computing device 214 can be configured to select or define an overall size and shape of each of the audio coverage areas 216 and 218 according to a size and shape of the corresponding cluster, as well as, general shape requirements for audio coverage areas (e.g., a requirement that each area be shaped as a square, rectangle, circle, oval, triangle, hexagon or other polygon, or any other shape), thus ensuring optimal coverage of the audio sources and allowing for better audio control and audio performance. For example, in FIG. 2, each of the audio coverage areas 216 and 218 has a generally rectangular shape to comply with the rectangular shape requirement for audio coverage areas, but the exact size and shape of each area 216, 218 is selected based on the size and shape of the corresponding clusters (e.g., as shown in FIG. 6) and to ensure maximum audio coverage of the audio sources without having overlap between adjacent audio coverage areas.

In addition, the computing device 214 can be further configured to optimize the audio coverage areas 216 and 218 in order to improve acoustic echo cancellation (AEC) operation and overall audio performance. For example, the computing device 214 may be configured to adjust or configure the size and shape of one or more of the audio coverage areas 216 and 218 based on the locations of nearby loudspeakers 208 (which may be used for playing far-end audio), noise source 210 (which may emit undesirable noise), and/or any other sounds in the environment 200 that should not be picked up by the microphones 206. In FIG. 2, for example, the first audio coverage area 216 has a substantially rectangular shape with a left-side boundary that stops just before first loudspeaker 208*a*, in order to prevent the microphones 206 from deploying lobes on or in the vicinity of the first loudspeaker 208*a*. As another example, the second audio coverage areas 218 has a substantially rectangular shape with a right-side boundary that stops just before second loudspeaker 208*b* and the noise source 210, in order to prevent the microphones 206 from deploying lobes on or in the vicinity of the second loudspeaker 208*b* and/or the noise source 210. In some embodiments, the computing device 214 is also configured to refine an accuracy of the audio coverage areas 216 and 218 by identifying any outlier or isolated location points within the clusters and removing those outlier(s) from the corresponding cluster (e.g., outliers 610 shown in FIG. 6).

Thus, the audio system of the environment 200 can be configured to automatically provide optimal audio coverage of the audio sources disposed around the table 204*a*. Once the above-described set-up or adaptation mode is complete, the audio system may implement the audio coverage areas 216 and 218 and begin operating in a normal use mode, similar to the audio system of the conferencing environment 100.

FIG. 3 illustrates another exemplary environment 300 that may be a classroom, meeting room, conference room, or other event space where the audio sources include one or more human talkers, similar to the environments 100 and 200. As shown, the environment 300 includes a plurality of chairs 302 disposed around a first table 304*a* and a second table 304*b* (collectively referred to as "tables 304"). The tables 304 may be located in different areas of the environment 300, and the audio sources may be seated in respective chairs 302 at the first or second tables 304. The environment 300 further includes a plurality of microphone arrays 306*a* and 306*b* (collectively referred to as "microphone arrays 306") disposed in separate locations of the environment 300, for example, in order to provide broader audio coverage. Each of the microphone arrays 306*a* and 306*b* may include a plurality of microphones, or individual microphone transducers, as will be appreciated.

The environment 300 also includes multiple components that may be substantially similar to corresponding components of the conferencing environment 100 shown in FIG. 1 and/or the environment 200 shown in FIG. 2. For example, the environment 300 further includes a plurality of loudspeakers 308*a*, 308*b*, 308*c*, and 308*d* (collectively referred to as "loudspeakers 308") that may be similar to the loudspeakers 208 of FIG. 2. The environment 300 also includes a noise source 310, similar to the noise source 110 of FIG. 1, and a presentation device 312 that is similar to the presentation device 112 of FIG. 1. Lastly, the environment 300 further includes a computing device 314 that is similar to the computing device 114 of FIG. 1 and/or the computing device 214 of FIG. 2. The computing device 314, the loudspeakers 308, the microphone arrays 306 may form an audio system that is similar to the audio system of FIG. 1 and/or the audio system of FIG. 2. For example, the audio system of the environment 300 may be configured to automatically set up a plurality of audio coverage areas for optimally capturing the audio sources in the environment 200, like the audio system of the conferencing environment 100 and the audio system of the environment 200. Accordingly, the similar components of the environment 300 will not be described in great detail for the sake of brevity.

As shown in FIG. 3, the audio system of the environment 300 may define three adjacent audio coverage areas 316, 318, and 320 that are configured to optimally capture the audio sources disposed at or near the tables 304 and/or the chairs 302, based on location data received from the microphone arrays 306 and analyzed by the computing device 314. For example, the computing device 314 may perform various techniques to identify localization coordinates within the location data that correspond to each of the detected audio sources. Based thereon, the computing device 314 may identify a first cluster of adjacent sound localization coordinates positioned at or near a first portion (e.g., right side) of the first table 304*a*, a first portion (e.g., right side) of the second table 304*b*, the space therebetween, and the chairs 302 that are located in the same vicinity. Accordingly, the computing device 314 may define a first audio coverage area 316 around the first cluster that extends from the chairs 302 disposed near (or facing) the first portion of the first table 304*a*, across the chairs 302 disposed near (or facing) the first portion of the second table 304*b*, and ends just beyond the first portion of the second table 304*b*, as shown in FIG. 3. Similarly, the computing device 314 may further identify a second cluster of adjacent sound localization coordinates positioned at or near a second portion (e.g., left side) of the second table 304*b* and the chairs 302 located nearby. In addition, the computing device 314 may identify a third cluster of adjacent sound localization coordinates positioned at or near a second portion (e.g., left side) of the first table 304*a* and the chairs 302 located nearby. Accordingly, the computing device 314 may define a second audio coverage area 318 around the second cluster and a third audio coverage area 320 around the third cluster, as shown in FIG. 3. The resulting audio coverage areas 316, 318, and 320 thus create three sound zones to focus audio pick-up on three different, but adjacent regions of the tables 304.

Like the computing devices 114 and 214, the computing device 314 can be configured to define an overall size and shape of each of the audio coverage areas 316, 318, and 320, according to a size and shape of the corresponding cluster, as well as, general shape requirements for audio coverage areas (e.g., a requirement for each area to be shaped as a square, rectangle, circle, oval, triangle, hexagon or other polygon, or any other shape), to ensure optimal coverage of the audio sources and allow for better audio control and optimal audio performance. In addition, like the computing device 214, the computing device 314 can be further configured to optimize the audio coverage areas 316, 318, and 320 by adjusting the size and shape of the areas to avoid overlap with the locations of any nearby loudspeakers 308, noise source 310, and/or any other sounds that might degrade acoustic echo cancellation (AEC) operation and other audio performance metrics if picked up by the microphone lobes. In some embodiments, the computing device 214 is also configured to refine an accuracy of the audio coverage areas 316, 318, and 320 by identifying any outlier or isolated location points within the clusters and removing those outlier(s) from the corresponding cluster (e.g., outliers 710 shown in FIG. 7).

In embodiments that include multiple microphone arrays, for example, as shown in FIG. 3, the computing device 314 can be further configured to compare the timestamps associated with the localization coordinates received from the microphone arrays 306 to identify time-synchronized localization coordinates, or coordinates that were generated by different microphone arrays 306 for the same detected audio source at the same point in time. As further described with respect to FIG. 8, in some embodiments, the computing device 314 may use the time-synchronized coordinates to transform the localization coordinates identified by, for example, the second microphone array 306*b* into the coordinate system of the first microphone array 306*a*. In this manner, the computing device 314 can use a common coordinate system to compare the localization coordinates generated by each of the arrays 306 for the same audio source and determine, for example, a relative position of the second microphone array 306*b* with respect to the first microphone array 306*a*. In other embodiments, the positions of one or more of the microphones arrays 306 may be pre-stored in a memory of the computing device 314, or otherwise readily known or available, for example, due to a user previously entering the position information using a user interface of the computing device 314, the position information being previously obtained using the above-described technique, the position information being provided by another component of the audio system, and others.

Once the positions, or relative positions, of the arrays 306 are determined, the audio system can be further configured to assign each audio coverage area to a given one of the microphone arrays based on a proximity of the array to the area. For example, in FIG. 3, based on the positions of the microphone arrays 306, the computing device 314 may determine that the first audio coverage area 316 is closer to the second microphone array 306*b* than the first microphone array 306*a* (e.g., using the proximity determination techniques described herein with respect to FIG. 8) and thus, may assign the first audio coverage area 316 to the second microphone array 306*b*. In response, the second microphone array 306*b* may deploy microphone lobes only within the first audio coverage area 316. Similarly, the computing device 314 may determine that each of the second and third audio coverage areas 318 and 320 are closer to the first microphone array 306*a* than the second microphone array 306*b* and thus, may assign the second and third coverage areas 318 and 320 to the first microphone array 306*a*. In response, the first microphone array 306*a* may deploy microphone lobes only within the second and third audio coverage areas 318 and 320. In various embodiments, the computing device 314 can be configured to use geometric distance calculations, such as, e.g., the Euclidean distance formula or other suitable technique, to determine the closeness or proximity of the microphone arrays 306 to a given audio coverage area.

Thus, the two microphone arrays 306 can be advantageously employed to provide optimal audio coverage of the audio sources disposed at or around the tables 304. Once the above-described set-up or adaptation mode is complete, the audio system of the environment 300 may implement the audio coverage areas 316, 318, and 320 and begin operating in a normal use mode, like the audio system of the conferencing environment 100.

Figure 4:
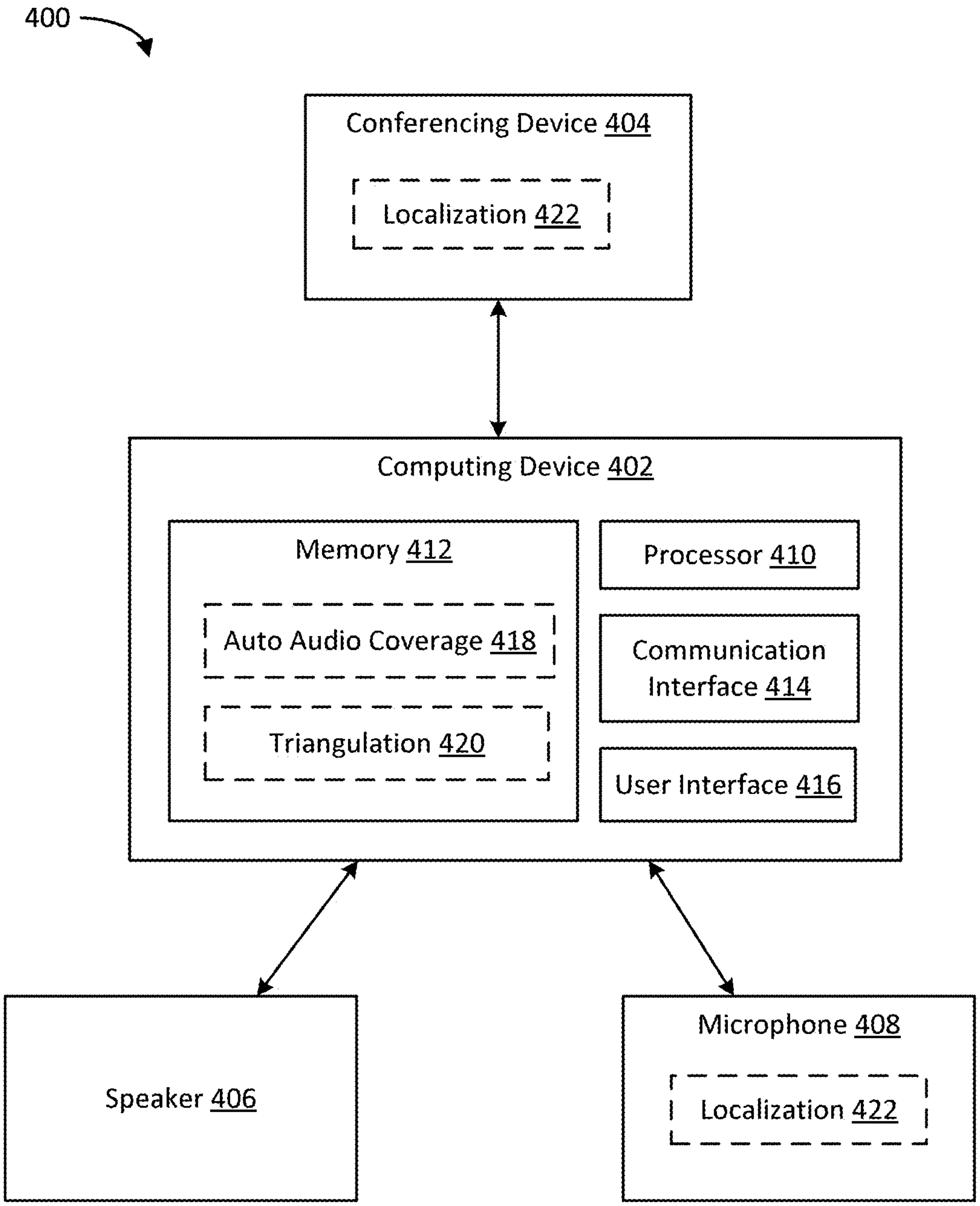
FIG. 4 is a block diagram illustrating an exemplary audio system, in accordance with one or more embodiments.

FIG. 4 illustrates an exemplary audio system 400 configured to carry out one or more automated audio coverage set-up and configuration operations described herein, in accordance with embodiments. As shown, the audio system 400 comprises a computing device 402 and one or more audio devices, such as conferencing device 404, loudspeaker 406, and/or microphone 408. The computing device 402 may be communicatively coupled to each of the audio devices using a wired connection (e.g., Ethernet, USB or other suitable type of cable) or a wireless network connection (e.g., WiFi, Bluetooth, Near Field Communication ("NFC"), RFID, infrared, etc.). In some embodiments, one or more components of the audio system 400 may be embodied in a single hardware device. For example, the loudspeaker 406 and the microphone 408 may be included in a single audio device (e.g., a network audio device or the like). As another example, one or more of the loudspeaker 406 and the microphone 408 may be included in the computing device 402, for example, as a native or built-in audio speaker or microphone.

In various embodiments, the audio system included in each of the environments 100, 200, and 300 (i.e., as shown in FIGS. 1-3, respectively) may be implemented using the audio system 400 (also referred to herein as an "audio conferencing system"). For example, each of the computing devices 114, 214, and 314 may be implementing using the computing device 402, and each of the loudspeakers 108, 208, and 308 may be implemented using the loudspeaker 406. In addition, each of the plurality of microphones 106, the plurality of microphones 206, and the plurality of microphone arrays 306 may be implemented using one or more of the conferencing device 404 and the microphone 408.

In some embodiments, the computing device 402 can be physically located in and/or dedicated to the given environment or room, for example, as shown in FIGS. 1-3. In other embodiments, the computing device 402 can be part of a network and/or distributed in a cloud-based environment. In various embodiments, the computing device 402 resides in an external network, such as a cloud computing network. In some embodiments, the computing device 402 may be implemented with firmware or completely software-based as part of a network, which may be accessed or otherwise communicated with via another device, including other computing devices, such as, e.g., desktops, laptops, mobile devices, tablets, smart devices, etc.

As shown in FIG. 4, the computing device 402 may comprise at least one processor 410, a memory 412, a communication interface 414, and a user interface 416 for carrying out the techniques described herein, including automatically defining one or more audio coverage areas (or audio pick-up regions) for optimally capturing audio sources in a given environment or room. The components of the computing device 402 may be communicatively coupled by system bus, network, or other connection mechanism (not shown). In various embodiments, the computing device 402 may be a personal computer (PC), a laptop computer, a tablet, a smartphone or other smart device, other mobile device, thin client, a server, or other computing platform. In such cases, the computing device 402 may further include other components commonly found in a PC or laptop computer, such as, e.g., a data storage device, a native, or built-in, microphone device, and a native audio speaker device. In some embodiments, the computing device 402 is a standalone computing device, such as, e.g., the computing device 114 shown in FIG. 1, or other control device that is separate from the other components of the audio system 400. In other embodiments, the computing device 402 resides in another component of the audio system 400, such as, e.g., the conferencing device 404 or an audio device that also includes the loudspeaker 406 and/or microphone 408.

Processor 410 executes instructions retrieved from the memory 412. In embodiments, the memory 412 stores one or more software programs, or sets of instructions, that embody the techniques described herein. When executed by the processor 410, the instructions may cause the computing device 402 to implement or operate all or parts of the techniques described herein, one or more components of the audio system 400, and/or methods, processes, or operations associated therewith, such as, e.g., process 500 shown in FIG. 5 and/or process 800 shown in FIG. 8. For example, as shown in FIG. 4, the memory 412 may include an automatic audio coverage component or software module 418 (also referred to herein as an "auto audio coverage component") that is configured to cause the computing device 402, or at least one processor 410, to automatically define one or more audio coverage areas for providing optimal audio coverage of the audio sources in a given environment, or otherwise carry out one or more operations of process 500 shown in FIG. 5. As another example, in some embodiments, the memory 412 also includes a triangulation component or software module 420 that is configured to cause the computing device 402, or at least one processor 410, to automatically determine a position of a first audio device relative to a second audio device within a given environment, or otherwise carry out one or more operations of process 800 shown in FIG. 8.

In general, the computing device 402 may be configured to control and communicate or interface with the other hardware devices included in the audio system 400, such as the conferencing device 404, the loudspeaker 406, the microphone 408, and any other devices in the same network. The computing device 402 may also control or interface with certain software components of the audio system 400, such as, for example, a localization module 422 installed or included in one or more of the conferencing device 404 and the microphone 408, in order to receive sound localization coordinates or other location data collected by the audio devices. For example, in some embodiments, the computing device 402 may operate as an aggregator configured to aggregate or collect location data from the appropriate audio devices. In addition, the computing device 402 may be configured to communicate or interface with external components coupled to the audio system 400 (e.g., remote servers, databases, and other devices). For example, the computing device 402 may interface with a component graphical user interface (GUI or CUI) associated with the audio system 400 and any existing or proprietary conferencing software. In addition, the computing device 402 may support one or more third-party controllers and in-room control panels (e.g., volume control, mute, etc.) for controlling one or more of the audio devices in the audio system 400.

Communication interface 414 may be configured to allow the computing device 402 to communicate with one or more devices (or systems) according to one or more protocols, including the above-described communications and protocols. In some embodiments, the communication interface 414 includes one or more wired communication interfaces, such as, for example, an Ethernet port, a high-definition serial-digital-interface (HD-SDI), an audio network interface with universal serial bus (ANI-USB), a high definition media interface (HDMI) port, a USB port, or an audio port (e.g., a 3.5 mm jack, lightning port, etc.). In some embodiments, the communication interface 414 includes one or more wireless communication interfaces, such as, for example, a broadband cellular communication module (e.g., to support 4G technology, 5G technology, or the like), a short-range wireless communication module (e.g., to support Bluetooth technology, Radio Frequency Identification (RFID) technology, Near Field Communication (NFC) technology, or the like), a long-range wireless communication module (e.g., to support Wi-Fi technology or other Internet connection), or any other type of wireless communication module. In some embodiments, communication interface 414 may enable the computing device 402 to transmit information to and receive information from one or more of the conferencing device 404, the loudspeaker 406, and the microphone 408, or other component(s) of the audio system 400. Such information may include, for example, location data (e.g., sound localization coordinates), audio coverage area assignments and parameters (or boundaries), lobe or pick-up pattern information, and more.

In various embodiments, the components or devices of the audio system 400 can use a common communication protocol (or "language") in order to communicate and convey location data and other information. For example, each component of the audio system 400 may include a communication interface that is similar to, or compatible with, the communication interface 414. In addition, one or more of the audio devices (e.g., conferencing device 404 and/or microphone 408) may include the localization module 422, which is configured to generate localization coordinates for detected audio sources and transmit the coordinates and/or other location data to the computing device 402 via the communication interface 414. In this manner, the components of the audio system 400 can be configured to form a network in which the common communication protocol is used for intra-network communication, including, for example, sending, receiving, and interpreting messages. The common communication protocol can be configured to support direct one-to-one communications between the computing device 402 and each of the other components or devices of the audio system 400 (e.g., conferencing device 404, loudspeaker 406, and/or microphone 408) by providing a specific application programming interface ("API") to each device. The API may be specific to the device and/or to the function or type of information being gathered from the device via the API. In the illustrated embodiment, for example, an API may be included in the localization module 422 that is installed in each of the conferencing device 404 and the microphone 408.

User interface 416 may facilitate interaction with a user of the computing device 402 and/or audio system 400. As such, the user interface 416 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 416 may also comprise devices that communicate with inputs or outputs, such as a short-range transceiver (RFID, Bluetooth, etc.), a telephonic interface, a cellular communication port, a router, or other types of network communication equipment. The user interface 416 may be internal to the computing device 402, or may be external and connected wirelessly or via connection cable, such as through a universal serial bus port. In some embodiments, the user interface 416 may include a button, touchscreen, or other input device for receiving a user input for implementing the audio coverage areas defined by the computing device 402, or to otherwise indicate the end of an adaptation or set-up mode of the audio system 400 and/or the beginning of a normal use mode of the audio system 400, as described herein.

Conferencing device 404 may be any type of audio hardware that comprises microphones and/or speakers for facilitating a conference call, webcast, telecast, or other meeting or event. For example, the conferencing device 404 may include, but is not limited to, SHURE MXA310, MX690, MXA910, MXA710, Microflex Wireless, and Microflex Complete Wireless, and the like. In embodiments, the conferencing device 404 may include one or more microphones for capturing near-end audio signals produced by conference participants situated in the conferencing environment (e.g., seated around a conference table). For example, the conferencing device 404 may include a plurality of microphones arranged as an array (i.e. a microphone array), or the like. The conferencing device 404 may also include one or more speakers for broadcasting far-end audio signals received from conference participants situated remotely but connected to the conference through third-party conferencing software or other far-end audio source. In various embodiments, the conferencing device 404 may be a network audio device that is coupled to the computing device 402 via a network cable (e.g., Ethernet) and configured to handle digital audio signals. In other embodiments, the conferencing device 404 may be an analog audio device or another type of digital audio device. While the illustrated embodiment shows one conferencing device 404, it should be appreciated that the audio system 400 may include multiple conferencing devices 404 in other embodiments, for example, as shown in FIG. 3.

Loudspeaker 406 may be any type of audio speaker, speaker system, or other audio output device for audibly playing audio signals associated with the conference call, webcast, telecast, or other meeting or event. For example, the loudspeaker 406 may include, but are not limited to, SHURE MXN5W-C and the like. In embodiments, the loudspeaker 406 may be configured to play far-end audio signals associated with the conference call or other event, or sounds produced by the far-end participants of the event (i.e., those not physically present in the conferencing room). In some embodiments, the loudspeaker 406 may be a standalone network audio device that includes a speaker, a native speaker built into a computer, laptop, tablet, mobile device, or other computing device in the audio system 400. In other embodiments, the loudspeaker 406 may be a loudspeaker coupled to the computing device 402 using a wireless or wired connection (e.g., via a Universal Serial Bus ("USB") port, an HDMI port, a 3.5 mm jack, a lightning port, or other audio port). In some cases, the loudspeaker 406 includes a plurality of audio drivers arranged in an array (i.e., a speaker array). While the illustrated embodiment shows one loudspeaker 406, it should be appreciated that the audio system 400 may include multiple loudspeakers 406 in other embodiments, for example, as shown in FIGS. 1-3.

Microphone 408 may be any type of microphone, including one or more microphone transducers (or elements), a microphone array, or other audio input device capable of capturing speech and other sounds associated with the conference call, webcast, telecast, or other meeting or event. For example, the microphone 408 may include, but is not limited to, SHURE MXA310, MX690, MXA910, and the like. In embodiments, the microphone 408 may be configured to capture near-end audio associated with the conference call or other event, or sounds produced by the near-end participants of the event (i.e., those located in the conferencing room). In some embodiments, the microphone 408 may be a standalone network audio device or a native microphone built into a computer, laptop, tablet, mobile device, or other computing device in the audio system 400. In other embodiments, the microphone 408 may be a microphone coupled to the computing device 402 using a wireless or wired connection (e.g., via a Universal Serial Bus ("USB") port, an HDMI port, a 3.5 mm jack, a lightning port, or other audio port). In some cases, the microphone 408 includes a plurality of microphone transducers arranged in an array (i.e., a microphone array), for example, like the microphone arrays 306*a* and 306*b* in FIG. 3. While the illustrated embodiment shows one microphone 408, it should be appreciated that the audio system 400 may include multiple microphones 408 in other embodiments.

Figure 5:
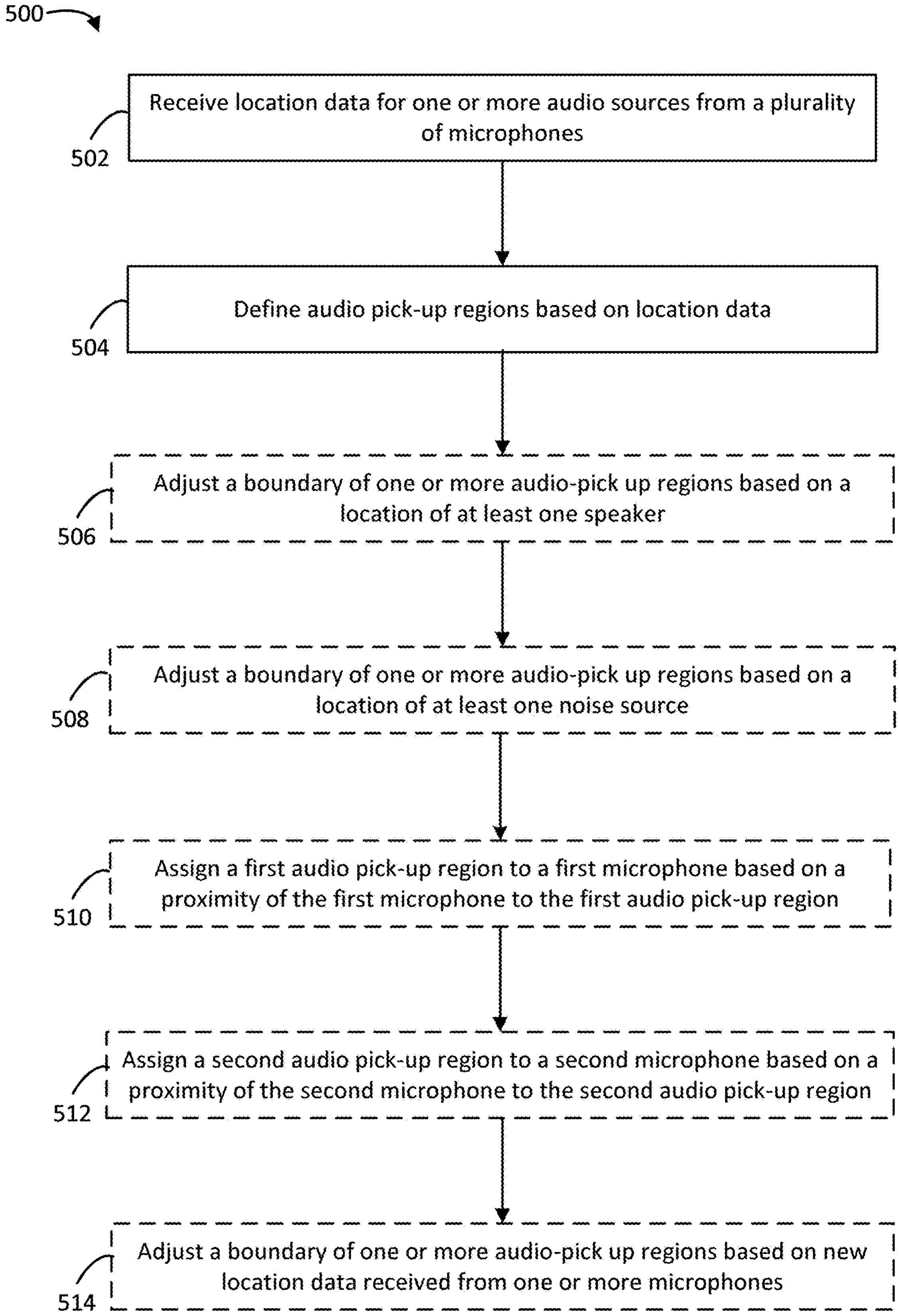
FIG. 5 is a flowchart illustrating an exemplary process for automatically configuring audio coverage of an environment, in accordance with one or more embodiments.

FIG. 5 illustrates an exemplary method or process 500 for automatically configuring audio coverage of an environment having a plurality of microphones communicatively coupled to a processor, in accordance with embodiments. The plurality of microphones comprises, at least, a first subset of microphones and a second subset of microphones. In some embodiments, the plurality of microphones are disposed in a single microphone array (e.g., as shown in FIGS. 1 and 2) (i.e. the first and second subsets of microphones are included in the same array). In other embodiments, the first subset of microphones is disposed in a first microphone array, and the second subset of microphones is disposed in a second microphone array (e.g., as shown in FIG. 3). The plurality of microphones may be part of one or more conferencing devices (e.g., conferencing device 404 of FIG. 4) and/or one or more other audio devices (e.g., microphone 408 of FIG. 4) included in an audio system (e.g., audio system 400 of FIG. 4). The audio system (also referred to as an "audio conferencing system") may also include one or more speakers (e.g., loudspeaker 406 of FIG. 4) or other types of audio devices. [

All or portions of the process 500 may be performed by one or more processors and/or other processing devices (e.g., analog to digital converters, encryption chips, etc.) that are within or external to the audio system, including the processor in communication with the plurality of microphones. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the process 500. For example, the process 500 may be carried out by a computing device (e.g., computing device 402 of FIG. 4), or more specifically a processor of said computing device (e.g., processor 410 of FIG. 4) executing software stored in a memory (e.g., memory 412 of FIG. 4), such as, e.g., the auto audio coverage module 418 and/or the triangulation module 420 of the audio system 400 in FIG. 4. In addition, the computing device may further carry out the operations of process 500 by interacting or interfacing with one or more other devices that are internal or external to the audio system and communicatively coupled to the computing device (e.g., conferencing device 404, speaker 406, and microphone 408 of FIG. 4).

As shown in FIG. 5, the process 500 may include, at step 502, receiving location data (or sound localization data) for one or more audio sources from the plurality of microphones, using at least one processor. The location data may be stored in a memory of the computing device (such as, e.g., memory 412 of FIG. 4), or other component of the audio system. In embodiments, the plurality of microphones can be configured to detect the one or more audio sources and generate location data to indicate a location or position of each audio source relative to the plurality of microphones. For example, the first subset of the plurality of microphones may generate location data that indicates the location of the audio source relative to the first subset of microphones, and the second subset of the plurality of microphones may generate location data that indicates the location of the audio source relative to the second subset of microphones.

In embodiments, the location data may include successive sound localization coordinates generated over time by localization software (e.g., localization module 422 of FIG. 4) associated with the plurality of microphones. In particular, the localization software may be configured to localize an active audio source (e.g., a person talking) within the environment by collecting or aggregating audio signals detected by a given subset of the microphones at a particular point in time (or simultaneously); based on the audio signals, determining or calculating, for each audio signal, a distance (e.g., Euclidean distance) between the source of the audio signal (i.e. the audio source) and the microphones; calculating an average distance between the audio source and the microphones, or an average of the distances determined for the simultaneously-detected audio signals; and based on the average distance, producing a set of coordinates (x, y, z) that represent the position of the audio source with respect to that subset of microphones at that point in time. In some embodiments, the localization software uses simultaneous, or nearly simultaneous, audio signals captured by a minimum or threshold number of microphones (e.g., at least two microphones) in order to produce sound localization coordinates for a given audio source. As an example, the first subset of the plurality of microphones may generate a first set of coordinates (x1, y1, z1) for defining the location of the audio source relative to the first subset of microphones at a first point in time, and the second subset of the plurality of microphones may generate a second set of coordinates (x2, y2, z2) for defining the location of the same audio source relative to the second subset of microphones, also at the first point time. If the first and second subsets of the plurality of microphones are included in a single microphone array, the localization coordinates may be generated by the localization module included in the single microphone array. If, on the other hand, the first and second subsets of the plurality of microphones are included in separate, or respective, microphone arrays, the first set of localization coordinates may be generated by the localization module included in a first microphone array, and the second set of localization coordinates generated by the localization module included a second microphone array, for example.

The localization coordinates can also include a timestamp ("T") or other timing component to provide a time reference for each localization, or otherwise indicate the time or order in which the coordinates were obtained or determined by the corresponding microphones. As an example, the timestamp may be attached to the set of coordinates by creating a quad coordinate (x, y, z, T) (e.g., a 4-tuple). In some embodiments, the location data may be collected during a specific time period, such as while the audio system is operating in a setup mode or other finite period of time. In other embodiments, the location data may be continuously collected or received from the plurality of microphones in order to support an ongoing or constant adaptation mode of the audio system, as described herein. In some embodiments, the timestamp associated with each set of coordinates may be used to determine which localization coordinates are relatively newer or more recently received, for example, where the processor is configured to use localization coordinates that are less than T seconds (or minutes) old to define an audio coverage area. In such cases, the processor may discard any localization coordinates that are older than and/or equal to T seconds, for example.

In some embodiments, the data received from the plurality of microphones also includes information about the type of audio source detected, such as, for example, whether the detected audio is far-end audio or near-end audio, or whether the detected sounds are voice sounds or noise sounds. Once this determination is made, the plurality of microphones may use a pre-established code (e.g., Voice, Noise, Combo, Far-end, Near-end, etc.) to indicate the type of audio in the location data. Such audio type codes may be determined and/or applied using various voice activity detection techniques, classification techniques, etc. In various embodiments, the plurality of microphones can be configured to identify the type of audio by using a voice activity detector ("VAD") included in the localization module or otherwise accessible to a processor associated with the microphones, or other suitable technique. The voice activity detector may be configured to analyze the structure of a detected audio signal and use energy estimation techniques, zero-crossing count techniques, cepstrum techniques, machine-learning or artificial intelligence methods, cues from video associated with the event, or any other suitable technique to identify or differentiate voice sounds and noise sounds, and/or to identify or differentiate far-end audio and near-end audio. As an example, with respect to near-end audio, the voice activity detector may differentiate between stationary noise and near-end speech or voice based on the energy of the signal, or may differentiate between non-stationary noise and near-end speech using cepstrum techniques, machine-learning or artificial intelligence methods, or the like. In some cases, the localization module, or other processor, may differentiate between far-end audio and near-end audio by comparing the detected audio signal to a far-end reference signal received from the computing device, the processor included therein, the loudspeaker, or other component of the audio system.

In embodiments where the plurality of microphones are included in more than one microphone array and the location data is received from two or more microphone arrays, the process 500 may further include, for example, transforming the localization coordinates received from the second microphone array into a coordinate system of the first microphone array, or otherwise converting the received coordinates to a common coordinate system, so that the position of each detected audio source can be represented in the same coordinate system. As an example, a coordinate-transform-matrix may be used to transform localization coordinates into the common coordinate system. Such transformation may be carried out by the computing device and/or processor once the position of each microphone array within the environment is known, for example, using the process 800 shown in FIG. 8, and/or based on previously-stored information about the locations of the arrays within the environment.

Step 504 comprises defining, using the processor, a plurality of audio pick-up regions (or audio coverage areas) in the environment based on the received location data. Each audio pick-up region may define an area in which at least one of the one or more audio sources is located. In some embodiments, the plurality of audio pick-up regions comprises a first audio pick-up region and a second audio pick-up region that does not overlap with the first audio pick-up region. For example, the first audio pick-up region may be located adjacent to the second audio pick-up region without overlapping each other (i.e. non-overlapping). In some cases, the two audio pick-up regions may be adjoining, or share a boundary, for example, like the audio coverage areas 216 and 218 shown in FIG. 2. In other embodiments, the first and second audio pick-up regions may at least partially overlap each other. In still other embodiments, the first and second audio pick-up regions may be located apart from each other, for example, in order to cover audio sources that are distant from each other or located at discrete locations within the environment.

In embodiments, defining the audio pick-up regions at step 504 comprises identifying clusters of adjacent localization coordinates (or location points) within the received location data, and forming a respective audio pick-up region around each cluster. In some embodiments, a clustering algorithm may be used to identify a group of adjacent localization coordinates based on the location data. For example, the clustering algorithm may include a k-means clustering algorithm, a centroid-based clustering algorithm, a density-based clustering algorithm, a grid-based clustering algorithm, any other suitable clustering technique, or any combination thereof. Each group of coordinates may be divided into one or more clusters depending on a size of the group (e.g., a distance from the center of the group to an outer edge of the group), a location of the group relative to the plurality of microphones, a proximity of the group to the audio source, and/or other factors. An audio pick-up region can then be formed, or identified, around each cluster.

In some embodiments, step 504 further includes determining that a given localization coordinate corresponds to a desired audio type before using that coordinate to define audio pick-up regions. For example, the processor may define the plurality of pick-up regions using only the localization coordinates that are identified as voice audio, near-end audio, or other desired audio (e.g., by the audio type codes received with the location data), and may ignore or disregard any localization coordinates that are identified as noise, far-end audio, a combination of voice and noise audio, a combination of near-end and far-end audio, or other undesired audio.

In some embodiments, defining the audio pick-up regions further comprises identifying one or more isolated or outlier location points within the received location data, and removing each outlier location point from the corresponding cluster, prior to creating the audio pick-up regions. As used herein, the term "outlier" refers to location points that may be grouped with a cluster initially but are significantly distant, or isolated, from the other location points, or localization coordinates, in the cluster. For example, a location point may be considered an outlier if it is more than a predetermined distance (e.g., 2 meters (m), 2.5 m, 3 m, etc.) away from the center of any other cluster. In some embodiments, a given location point or set of points may be initially identified as the start of a cluster, but if that cluster does not grow in density over time, the corresponding location point(s) may be re-classified as outlier(s). In some cases, the outliers may be the result of localization error, such as, for example, a consequence of reverb. In other cases, the outliers may represent spurious audio signals detected by the microphones due to other error. Such outliers may skew a shape and/or size of the corresponding cluster if not removed, which may result in less-than-optimal coverage of the audio sources. Thus, the processor can be configured to optimize the one or more clusters by identifying and removing any isolated or spurious location points from the clusters.

To help illustrate the above techniques, FIG. 6 shows an exemplary plot or "heat map" 600 of location data obtained for a given environment (e.g., a meeting room, a classroom, a conference room, an event space, etc.) by an audio system (e.g., audio system 400 of FIG. 4). The plot 600 may be generated by a processor (e.g., processor 410 of FIG. 4) of the audio system while carrying out one or more aspects of the process 500, such as, for example, step 504. The location data comprises a plurality of location points 602 received, at the processor, from a plurality of microphones (such as, e.g., microphone 408 and/or conferencing device 404 in FIG. 4), in accordance with step 502 of the process 500. Each location point may be represented by, or include, a set of localization coordinates (x, y, z) generated by the corresponding microphone (or microphone array), The plot 600 graphically depicts the location points 602 relative to x and y axes. As shown in FIG. 6, the plot 600 can be configured as a two-dimensional heat map that represents the location points 602 using a color code (e.g., different colors to represent different values), or other data visualization technique capable of showing a density of the location points 602, or relative "heat," at different locations of the environment. In the illustrated embodiment, the plurality of microphones are embodied in a single microphone array 604 (e.g., like the microphone array 206 of FIG. 2), and the plot 600 shows the location of the microphone array 604 relative to the location data. As an example, the plot 600 may represent the location data received from the microphone array 206 shown in FIG. 2 and used by the computing device 214 to define the audio coverage areas 216 and 218 of FIG. 2.

As shown in FIG. 6, most of the location points 602 are clustered together in one large group, but a number of the location points 602 extend above or below the larger group. In embodiments, the processor may use a clustering algorithm to divide the location points 602 into two clusters 606 and 608, in accordance with step 504 of the process 500. For example, the first cluster 606 may include an upper grouping of the location points 602, including a portion of the larger group and the location points 602 that extend above the larger group. The second cluster 608 may include a lower grouping of the location points 602, including the remainder of the larger group and the location points 602 that extend below the larger group. As shown, the first cluster 606 may end where the second cluster 608 begins in order to ensure that no audio sources are left out.

In embodiments, the clusters 606 and 608 may be optimized by identifying and removing any isolated or spurious coordinates within the location points 602. For example, as shown in FIG. 6, the location points 602 may include a number of outlier location points 610 (also referred to as "outliers") that are located a significant distance (e.g., at least 2.5 meters) from the rest of the location points 602 or from a center of the nearest cluster (e.g., cluster 608), or are otherwise isolated from the rest of the group. The processor can be configured to identify the outliers 610 based on, for example, a distance between the outlier 610 and a center of the closest cluster (e.g., cluster 608 in FIG. 6), a distance between the outlier 610 and another location point in this same cluster, detection of empty space around the outlier 610 or other criteria for identifying isolation, detection of a very small number (e.g., three or less) of location points at or around the outlier 610, and/or other criteria. In some embodiments, the processor may identify a location point as an outlier after receiving a low localization confidence score for that location point, or other measurement indicating that the location point has very infrequently been identified as a valid localization coordinate and/or is unlikely to be an accurate or valid data point. In some embodiments, the outliers 610 may be included in the cluster 608 initially, for example, at the time of creating the clusters 606 and 608. However, the processor may discard the outliers 610 from the cluster 608 after determining that they are spurious or erroneous location points, for example, in accordance with step 504 of the process 500.

Referring back to FIG. 5, once the clusters are identified and refined, the processor may define the physical parameters (e.g., minimum and maximum values) of each cluster by locating a centroid (or central point) of the cluster and identifying one or more boundaries for the cluster based on the maximum or outermost location points on various sides of the cluster and a distance between the centroid and each of the outermost location points. This information may be used by the processor to select an appropriate size and shape for the corresponding audio pick-up region, or otherwise draw the boundaries thereof.

The overall size and shape of each audio pick-up region may also be determined based on other criteria, e.g., in addition to the size and shape of the corresponding cluster. For example, the audio system may have a preset shape requirement for all audio pick-up regions that may be stored in memory or otherwise accessible to the processor, such as, e.g., a requirement that each area be shaped as a square, rectangle, circle, oval, triangle, hexagon or other polygon, or any other shape. As another example, the size and shape of each audio pick-up region may be determined based on the presence of other regions and/or a known shape of the room or environment. The size and shape of each audio pick-up region may also be selected in order to minimize the total number of audio pick-up regions used for the environment and maximize coverage of the audio sources detected in the environment. For example, the audio pick-up regions may be placed adjacent to each other, or with adjoining boundaries that do not overlap, in order to make sure each audio source is covered by only one of the audio pick-up regions.

In some embodiments, the process 500 further comprises, at step 506, adjusting, using the processor, a boundary of one or more of the audio pick-up regions based on a location of at least one speaker (e.g., loudspeaker 406 of FIG. 4) disposed in the environment. For example, the audio pick-up regions may be resized and/or re-shaped in order to avoid any loudspeakers in the environment. This ensures that the microphone lobes deployed within each region are not deployed on or in the vicinity of a speaker, which would degrade acoustic echo cancellation (AEC) operation, for example, if the speakers are used to play far-end audio. Thus, the loudspeaker locations can be used to further optimize the audio pick-up regions. In some embodiments, step 506 also includes estimating or determining the location of the at least one speaker, for example, using aspects of process 800 shown in FIG. 8. In other embodiments, the location of each speaker may already be known and stored in memory.

In some embodiments, the process 500 further comprises, at step 508, adjusting, using the processor, a boundary of one or more of the audio pick-up regions based on a location of at least one noise source (e.g., noise source 210 of FIG. 2) in the environment. The noise source may be a persistent source of undesirable sounds, such as, for example, an HVAC vent, a fan, an exhaust, and the like. The audio pick-up regions may be resized and/or re-shaped in order to avoid any noise sources in the environment, so that the microphone lobes deployed within each region are not deployed on or in the vicinity of a noise source. In some embodiments, step 508 also includes estimating or determining the location of the at least one noise source, for example, based on location data that identifies detected audio as noise and/or other techniques. In other embodiments, the location of each noise source may already be known and stored in memory.

In some embodiments, the processor may use an appropriate cost function or other suitable formula to select a more optimal size and shape for each audio pick-up region. For example, the cost function may weigh or consider a number of parameters, such as an overall size of each cluster, a total number of clusters identified for the location data, the known or determined positions of loudspeakers and/or persistent noise sources within the room, a general shape requirement for audio coverage areas, a requirement to avoid overlap between adjacent audio coverage areas, and/or other constraints. By minimizing the cost function based on these constraints while clustering the location points received in the localization data, the processor can obtain more audio coverage areas for the audio sources detected in the environment.

In some cases, the processor may select the size and shape for each audio coverage area after determining that the received location points meet certain threshold criteria, such as, for example, a minimum number of location points, a maximum number of location points, a preset range for the number of location points, and others. For example, if the number of received location points falls below a minimum threshold, the processor may wait for more location points before beginning the clustering process, so that there is a high enough "heat" to generate the heat map shown in FIG. 6. In some cases, the number of location points needed to determine the optimal audio coverage area(s) may vary depending on the type of environment or other characteristic of the environment. For example, a small, enclosed room may require fewer localization coordinates than a large, open meeting space to properly define the audio coverage area(s) for that room.

In some cases, two or more adjacent audio pick-up regions may be merged together if the combined region is more optimal or better satisfies certain threshold criteria (e.g., size and/or shape criteria, minimum or preset number of location points, maximum number of audio pick-up regions per room, etc.). For example, the processor may decide to merge two or more audio pick-up regions that are adjacent to each other based on an optimization of certain thresholds or parameters, such as, for example, a total number of audio pick-up regions (e.g., to avoid tracking too many small, fragmented regions), a total area covered by the audio pick-up regions before and after merging (e.g., to avoid creating a merged region that is too large in overall size), and a distance between the location points in the audio pick-up region and the centroid of that region before and after merging (e.g., to avoid creating enormous audio pick-up regions with location points that are too far away from the center of the merged region to be part of the same "cluster").

In some cases, the processor may use these parameters to define or determine a merge cost for merging two or more audio pick-up areas and may decide to merge the regions if the merge cost is minimal or can be minimized. As an example, two adjacent regions that are relatively small, rectangular in shape, and approximately the same or similar in size can be merged together with a relatively small merge cost penalty, as the point clusters would be generally centered about the center of the merged region. On the other hand, if two adjacent regions are relatively large in size and are shaped as long, narrow rectangles that extend so as to form an L-shape, merging the regions would incur a relatively large merge-cost penalty, as the merged region would be a very large rectangle with a center that is not centered relative to the point clusters of the individual regions. Similar techniques may be used when deciding whether an existing audio pick-up region should be divided or split into two or more regions, for example, because the single region exceeds certain threshold criteria (e.g., too large in size, too unwieldy in shape, includes too many location points, location points are too spread out, etc.) and/or optimization of the above thresholds or parameters warrants the division.

Referring back to FIG. 6, the plot 600 includes a first audio pick-up region 612 formed around the first cluster 606 and a second audio pick-up region 614 formed around the second cluster 608, in accordance with step 504 and steps 506 and/or 508. For example, the first audio pick-up region 612 may be configured, or shaped, as a long rectangle in order to encompass all of the upper location points 602 in the first cluster 606. Similarly, the second audio pick-up region 614 may be configured, or shaped, as a short rectangle in order to encompass all of the lower location points 602 in the second cluster 608. In addition, the first and second audio pick-up regions 612 and 614 may be further configured, or shaped, to avoid one or more loudspeakers and/or noise sources in the environment, such as, for example, loudspeakers 208*a* and 208*b*, and noise source 210 shown in FIG. 2.

In embodiments where the plurality of microphones are included in a plurality of microphone arrays, the process 500 can further include assigning each audio pick-up region defined at step 504, and refined at steps 506 and 508, to one of the plurality of microphone arrays. For example, in FIG. 5, process 500 further includes, at step 510, assigning, using the processor, the first audio pick-up region to a first microphone array based on a proximity of the first microphone array to the first audio pick-up region, such that the first microphone array can deploy one or more lobes within the first audio pick-up region. Process 500 also includes, at step 512, assigning, using the processor, the second audio pick-up region to a second microphone array based on a proximity of the second microphone array to the second audio pick-up region, such that the second microphone array can deploy one or more lobes within the second audio pick-up region. In some embodiments, the process 500 further includes determining the proximity of the first microphone array to each of the first audio pick-up region and the second audio pick-up region, and determining the proximity of the second microphone array to each of the first audio pick-up region and the second audio pick-up region, for example, using aspects of process 800 shown in FIG. 8. These proximity determinations may be made based on various distance measurements, such as, for example, the distance (e.g., Euclidean distance) between the centroid of a given cluster and the center of each microphone array, or the distance between a maximum boundary line of a given cluster and the center of each microphone array. For example, the cluster whose centroid is the closest to (or located the shortest distance from) the center of a given microphone array may be assigned to, or affiliated with, the given microphone array at steps 510 or 512 of process 500. Thus, each audio pick-up region can be assigned to the microphone array that can best cover the given region. As will be appreciated, while the illustrated example describes only two audio pick-up regions and two microphone arrays, it should be appreciated that the method 500 can further include assigning additional audio pick-up regions to additional microphone arrays, or to one of the same two microphone arrays.

To help illustrate the above techniques, FIG. 7 shows an exemplary plot or "heat map" 700 of location data obtained for a given environment by an audio system having multiple microphone arrays. In general, the plot 700 may be similar to the plot 600 of FIG. 6. For example, the plot 700 may be generated by a processor of the audio system while carrying out one or more aspects of the process 500, such as, for example, steps 504 through 510. Moreover, the location data comprises a plurality of location points 702, or localization coordinates (x, y, z), received from a plurality of microphones, in accordance with step 502 of process 500, similar to location points 602. And the plot 700 graphically depicts the location points 702 relative to x and y axes using different colors to represent different values, or as a two-dimensional heat map, like the plot 600 in FIG. 6.

Unlike the plot 600, however, the plot 700 shows location points 702 received from the microphones of two separate microphone arrays 704 and 705 and shows the locations of the microphone arrays 704 and 705 relative to the location data. In some embodiments, the locations of the microphones arrays 704 and 705 may be previously known and stored in a memory. In other embodiments, the locations of the arrays 704 and 705 may be estimated or determined using one or more techniques described herein, such as, for example, process 800 of FIG. 8. In the illustrated embodiment, the microphone arrays 704 and 705 may be disposed near a center of the room or environment. For example, the plot 700 may represent the location data that is received from the microphone arrays 306*a* and 306*b* shown in FIG. 3 and used by the computing device 314 to define the audio coverage areas 316, 318, and 320 of FIG. 3. In other embodiments, the microphone arrays 704 and 705 may be disposed further apart, such as, for example, on opposite sides of the room to provide better coverage of the entire room.

As shown in FIG. 7, the location points 702 form three groups or clusters. A first cluster 706 is formed near the first microphone array 704. A second cluster 708 is formed adjacent to the first cluster 706 and near the second microphone array 705. A third cluster 709 is formed above the first cluster 706 and is furthest from the second microphone array 705. The processor may use the clustering algorithm described herein to divide the location points 702 into the three clusters 706, 708, and 709. The processor may also optimize or refine the clusters by removing any spurious or isolated coordinates within the location points 702, such as, for example, outlier location points 710 shown in FIG. 7.

Once the clusters 706, 708, and 709 are refined, the processor may define or form an audio pick-up region around each, in accordance with step 504 of process 500. In particular, a first audio pick-up region 712 may be formed around the first cluster 706, a second audio pick-up region 714 may be formed around the second cluster 708, and a third audio pick-up region 716 may be formed around the third cluster 709. As shown in FIG. 7, each audio pick-up region may be configured, or shaped, according to a size and shape of the cluster disposed within it. For example, the third audio pick-up region 716 is the largest of the three because the location points 702 of the third cluster 709 are scattered across a larger area. In addition, one or more of the regions 712, 714, and 716 may be further configured, or shaped, to avoid one or more loudspeakers and/or noise sources within the environment, such as, for example, loudspeakers 308*a* and 308*b* in FIG. 3.

Once the audio pick-up regions 712, 714, and 716 are defined and refined, the processor may assign each of the regions to one of the microphone arrays 704 and 705, in accordance with steps 510 and 512 of process 500. For example, upon determining that the first audio pick-up region 712 is closest to the first microphone array 704, the processor may assign the first audio pick-up region 712 to the first microphone array 704. Upon determining that the second audio pick-up region 714 is closest to the second microphone array 705, the processor may assign the second audio pick-up region 714 to the second microphone array 705. And upon determining that the third audio pick-up region 716 is closest to the first microphone array 704, the processor may assign the third audio pick-up region 716 to the first microphone array 704. Thus, the room may be divided into two sound zones, the "left" zone for placement of lobes from the first microphone array 704 and the "right" zone for placement of lobes from the second microphone array 705. In other embodiments, the processor may be configured to assign a given audio pick-up region to multiple microphone arrays, such that, for example, microphone elements from two different microphone arrays can be used to deploy microphone lobes in the same region.

Referring back to FIG. 5, in some embodiments, the process 500 further comprises, at step 514, adjusting, using the processor, a boundary of one or more of the audio pick-up regions based on new location data received from one or more of the plurality of microphones. The new location data may be a new set of coordinates or location points indicating, for example, a newly-detected audio source, or movement of an existing audio source to a new location in the room. The boundary may be adjusted based on the new location data by repeating steps 504 through 512, as needed. For example, at step 504, the processor may calculate a distance (e.g., Euclidean distance) between a new location point and the centroid of each existing cluster; based on said calculations, assign the new location point to the nearest cluster; and adjust the boundary of the audio pick-up region that corresponds to the nearest cluster to include the new location point. At steps 506 and/or 508, the processor may adjust a boundary of the re-defined region(s) to avoid a speaker and/or noise source. And at steps 510 and 512, the processor may change the microphone array assignments for one or more of the audio pick-up region(s) in light of the adjustments made in steps 504, 506, and/or 508. In some embodiments, the processor may be configured to iteratively repeat steps 504 to 512 each time a new set of coordinates is received. In other embodiments, the processor may be configured to wait for receipt of a threshold number of location points or the passing of a preset period of time before performing steps 504 to 512 again.

In some embodiments, one or more of the audio coverage areas may be removed based on the new location points. For example, the new localization data and/or further processing may indicate that a certain cluster of location points includes outliers and/or undesirable noise sources or loudspeaker locations and thus, should not be included in an audio coverage area. As another example, the processor may remove a given audio coverage area upon determining that a loudspeaker of the audio system has been moved to a new location that falls within or overlaps with the given audio coverage area. The movement of the loudspeaker to the new location may be determined by the processor based on new location data received from one or more of the microphones, and using a triangulation technique for identifying the position of the loudspeaker relative to the one or more microphones within the environment, for example, as described with respect to FIG. 8.

In some embodiments, the process 500 may be performed during a setup or configuration mode of the audio system during which an installer purposefully applies stimulus, or creates sounds, in the locations where human talkers or other audio sources are expected to be present, or the areas where the installer wants to set up audio pick-up regions, for example, as shown in FIGS. 13A to 14D. During said setup mode, the installer may also play far-end audio over the loudspeakers to make sure the loudspeaker locations are excluded from the audio pick-up regions. In such embodiments, the process 500 may end after step 514, or after the installer manually ends the setup mode, implements the audio pick-up regions created using the process 500, and/or begins a normal use mode of the audio system.

In other embodiments, the process 500 may be performed during an offline mode of the audio system during which historical localization data collected over a long period of time may be used to automatically define the audio pick-up regions. For example, the historical data may include localization coordinates generated by the plurality of microphones over time while the room was used for various purposes (e.g., for conference calls or other meeting events). The historical data may also indicate whether the audio sources detected by the microphones represent far-end audio, near-end audio, voice sounds, noise sounds, etc. Once a threshold amount of data is collected, or after a threshold amount of time has passed, the processor may automatically set up the best coverage areas for the collected localization data using the process 500. For example, in embodiments that include two or more microphone arrays, the processor may be configured to calculate the transform function used to estimate the relative positions of the arrays once the location data includes a threshold number (e.g., 50, etc.) of time-synchronized pairs of location points, or localization coordinates that were generated by two different microphone arrays at the same time. As another example, the processor may be configured to calculate the transform function (or complete calculation of the transform function) once the mean squared error, or other measure of estimation error, is below a threshold value (e.g., 10 centimeters (cm), etc.).

In terms of clustering the location points to determine coverage areas, in some embodiments, the processor, or clustering algorithm, may be configured to divide the location points into clusters once, for example, the number of available location points reaches a threshold number (e.g., 500, etc.). In other embodiments, the processor, or clustering algorithm, may be configured to use all historical data that is available, regardless of the exact amount. In still other embodiments, the processor may be configured to stop the clustering algorithm upon determining that a new cluster has not been formed and/or no substantial changes have been made to a geometry, or shape and size, of the existing clusters over a given period of time (e.g., at least one minute, etc.) or for a threshold number (e.g., 50, etc.) of consecutive localization points.

In some embodiments, the process 500 may further include receiving manual adjustments to one or more of the audio pick-up regions or other aspects, for example, via a user input device (e.g., user interface 416 of FIG. 4) included in or associated with the audio system, and implementing the manual adjustments using the one or more processors. As an example, a user or installer of the system may choose to modify or adjust the audio pick-up regions that were automatically determined by the one or more processors using one or more of steps 504 to 514. As another example, the user may enter exact position information for one or more microphone arrays, which may be used by the one or more processors in place of the estimated or triangulated array positions obtained using process 800 of FIG. 8. Other exemplary manual modifications may include, for example, changing or adjusting one or more boundaries of the audio pick-up regions defined at step 504 or refined at steps 506 and/or 508, resizing or otherwise changing a size and/or shape of one or more of the audio pick-up regions, changing or adjusting the microphone array assignments determined at steps 510 and 512, removing one or more of the audio pick-up regions altogether, merging two audio pick-up regions into one region, separating a given audio pick-up region into two or more regions, changing one or more of the parameters of the clustering algorithm (e.g., distance for defining an outlier, etc.), or any other adjustment. In response to receiving a manual adjustment via the user input device, the one or more processors can be configured to implement the manual adjustment. For example, if the manual adjustment is to change a boundary of a particular audio pick-up region, the processor may be configured to re-define the boundaries of that audio pick-up region accordingly, using the techniques described herein.

In some embodiments, the process 500 further includes a preliminary step of deactivating or removing any pre-existing audio-pick regions before proceeding with step 502, so that a completely new set of audio pick-up regions can be formed based on the most recent location data.

In some embodiments, the process 500 further includes adjusting one or more of the audio pick-up regions to accommodate a pre-existing audio pick-up region stored in a memory (e.g., for automatic adjustment) or provided by a user (e.g., for manual adjustment). For example, a given environment may include a dedicated audio pick-up region centered on a podium, platform, whiteboard/chalkboard, or other designated presentation space in the environment. One or more of the audio pick-up regions automatically determined at steps 504 to 514 may be adjusted by resizing or otherwise changing a boundary, size, and/or shape of the one or more regions, by merging or separating the regions, or any adjustment needed to make room for or accommodate the pre-existing audio pick-up region.

Figure 8:
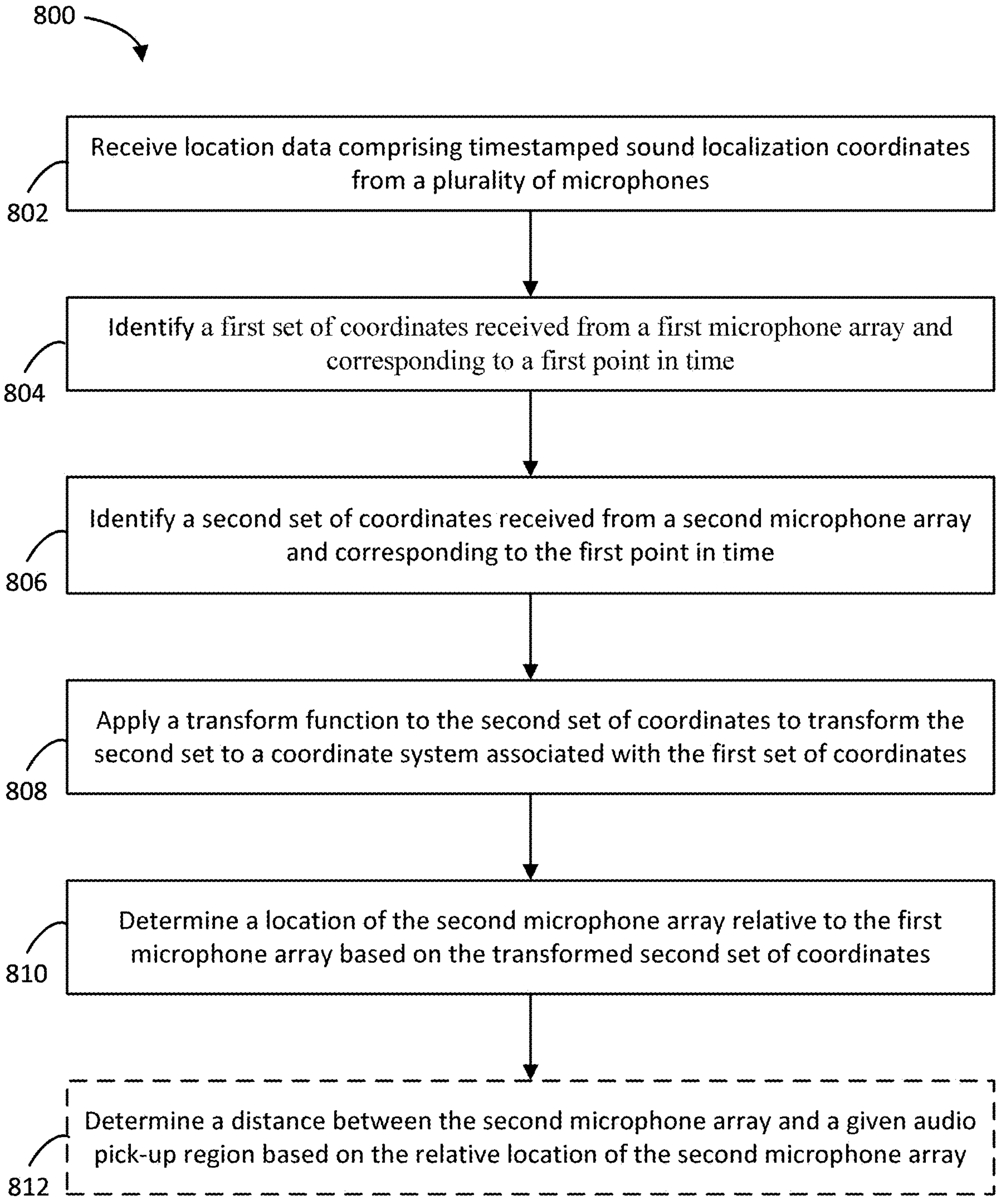
FIG. 8 is a flowchart illustrating an exemplary process for automatically determining a position of a first audio device relative to a second audio device, in accordance with one or more embodiments.

FIG. 8 illustrates an exemplary method or process 800 for automatically determining or triangulating a position of a first audio device relative to a second audio device within an environment using sound localization data obtained from a plurality of microphones, in accordance with embodiments. The audio devices may be part of an audio system (e.g., audio system 400 of FIG. 4). In embodiments, the first audio device may be any type of audio device, such as, for example, the conferencing device 404, speaker 406, and microphone 408 shown in FIG. 4. And the second audio device may be any type of microphone array or other audio input device comprising two or more microphones, such as, for example, the conferencing device 404 and/or microphone 408 shown in FIG. 4. The process 800 may be performed by one or more processors (e.g., processor 410 of FIG. 4) during, or as part of, the process 500 shown in FIG. 5. For example, in some embodiments, the process 800 may begin after or during step 502 of FIG. 5. Also, in some embodiments, the process 800 may be performed as a part of steps 510 and/or 512 of FIG. 5 in order to determine which microphone array is closer to a given audio pick-up region for microphone assignment purposes.

For ease of explanation, the process 800 will be described with reference to FIG. 9, which shows an exemplary environment 900 comprising a first microphone array 902, a second microphone array 904, and an audio source 906. However, it should be appreciated that the process 800 may also be used to determine the positions of three or more microphone arrays and/or other types of microphones.

All or portions of the process 800 may be performed by one or more processors and/or other processing devices (e.g., analog to digital converters, encryption chips, etc.) that are within or external to the audio system, including the processor in communication with the plurality of microphones. In addition, one or more other types of components (e.g., memory, input and/or output devices, transmitters, receivers, buffers, drivers, discrete components, logic circuits, etc.) may also be used in conjunction with the processors and/or other processing components to perform any, some, or all the steps of the process 800. For example, the process 800 may be carried out by a computing device (e.g., computing device 402 of FIG. 4), or more specifically a processor of said computing device (e.g., processor 410 of FIG. 4) executing software stored in a memory (e.g., memory 412 of FIG. 4), such as, e.g., triangulation module 420 of the audio system 400 in FIG. 4. In addition, the computing device may further carry out the operations of process 800 by interacting or interfacing with one or more other devices that are internal or external to the audio system and communicatively coupled to the computing device (e.g., conferencing device 404, speaker 406, and microphone 408 of FIG. 4).

As shown in FIG. 8, process 800 comprises, at step 802, receiving, at the processor, location data (or sound localization data) for one or more audio sources from a plurality of microphones disposed in an environment. In various embodiments, step 802 may be substantially similar to step 502 of FIG. 5. For example, like step 502, the location data received at step 802 may include successive sound localization coordinates (x, y, z) generated over time by localization software (e.g., localization module 422 of FIG. 4) associated with the plurality of microphones to indicate the position of each audio source relative to the microphones. The location data also includes a timestamp with each set of coordinates to provide a time reference for each localization. The timestamp ("T") may be attached to the localization coordinates by creating a quad coordinate (x, y, z, T) (e.g., a 4-tuple).

Step 804 comprises, based on the timestamps included in the location data, identifying, using the processor, a first set of coordinates received from a first microphone array and corresponding to a first point in time. Further, step 806 comprises, based on said timestamps, identifying a second set of coordinates received from a second microphone array and corresponding to the first point in time. Thus, at steps 804 and 806, the location data received at step 802 may be sorted so that time synchronized (or simultaneous) coordinates can be grouped or paired together. In some embodiments, coordinates that belong to the same audio source but have different timestamps (e.g., T1 and T2) may still be identified as time-synchronized pairs if the timestamps are sufficiently close (e.g., the difference between T1 and T2 is less than a preset threshold).

Figure 9:
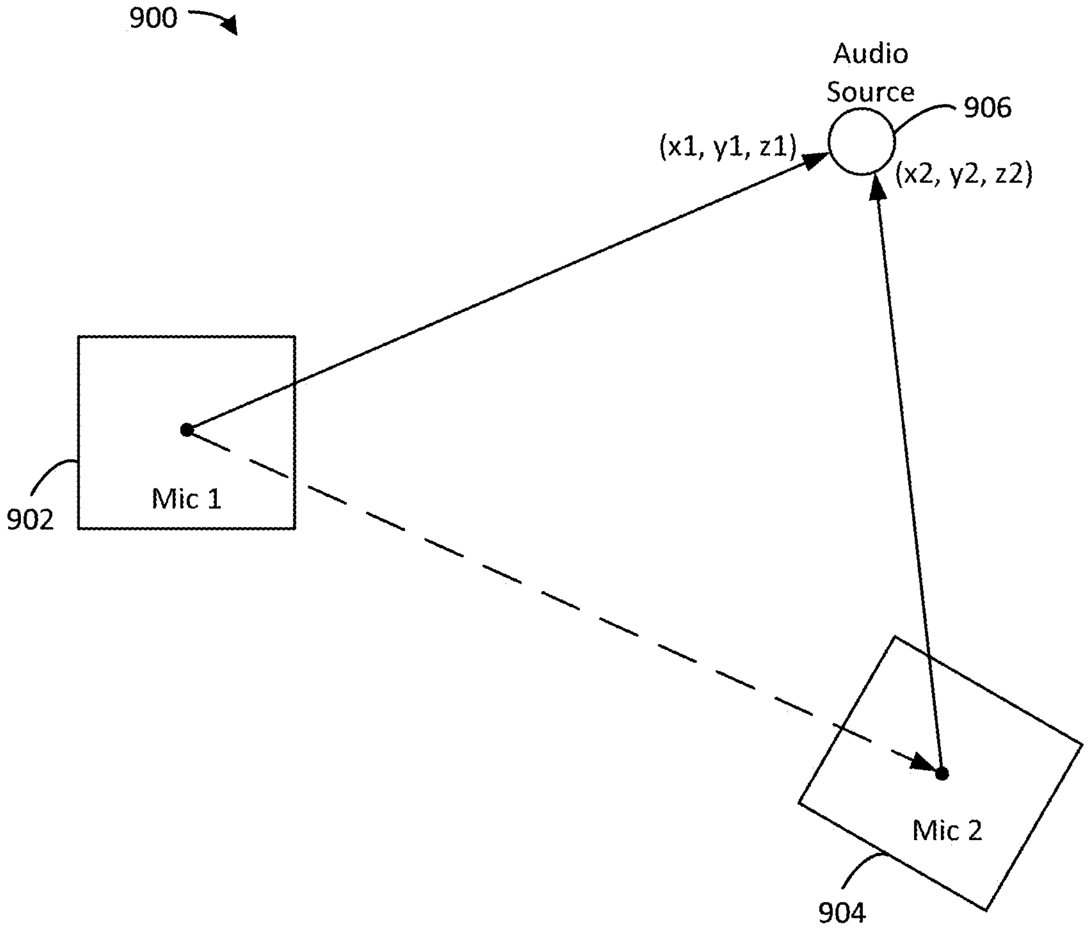
FIG. 9 is a schematic diagram illustrating an exemplary technique for determining a position of a given microphone relative to another microphone, in accordance with one or more embodiments.

As an example, in FIG. 9, the location data received at step 802 may include successive sound localization coordinates collected by each of the first microphone array 902 and the second microphone array 904 over a given time period to represent the position of the audio source 906 relative to each of the arrays 902 and 904. For example, the location data for representing localization of the audio source 906 at a first point in time (T1) may include a first set of timestamped sound localization coordinates (x1, y1, z1, T1) representing the position of the audio source 906 relative to the first microphone array 902 at the first point in time, and a second set of timestamped sound localization coordinates (x2, y2, z2, T1) representing the position of the audio source 906 relative to the second microphone array 904 at the first point in time.

Step 808 comprises determining or estimating a transform function using the processor, to transform or convert the second set of coordinates identified at step 806 into a coordinate system associated with the first set of coordinates identified at step 804. Step 808 also includes applying the transform function to the second set of coordinates to obtain a transformed second set of coordinates that are in the same coordinate system as the first set of coordinates. In this manner, the localization coordinates received at step 802 from various microphones can be transformed or converted to a common coordinate system, as needed.

For example, the first microphone array 902 may be associated with a first coordinate system whose origin is the center of the first microphone array 902, while the second microphone array 904 may be associated with a second coordinate system whose origin is the center of the second microphone array 904. Thus, the first set of coordinates (x1, y1, z1) and the second set of coordinates (x2, y2, z2) both represent the same location, i.e. the location of the audio source 906, using two different coordinate systems. At step 808, the second set of coordinates (x2, y2, z2) may be transformed into a new set of coordinates within the first coordinate system using the transform function. While FIG. 9 shows the first coordinate system as being the common coordinate system, in other embodiments, a second coordinate system of the second microphone array 904 may be used as the common coordinate system.

In embodiments, the transform function used to transform the second set of coordinates into the first coordinate system may be a coordinate-change transform matrix, which enables coordinates obtained across different coordinate systems for the same location point (e.g., the audio source 906) to be compared. The transform matrix may use linear translation ("T") and rotation ("R") values to transform coordinates from a second coordinate system into coordinates from a first coordinate system. In some embodiments, the transform matrix may be better estimated (e.g., with smaller error) once there is a large enough number of coordinate pairs, or distinct, simultaneous localization points for the same audio source from multiple microphones. In such cases, step 808 includes estimating the transformation matrix once a threshold number of coordinate pairs are collected (e.g., at least four pairs or other minimum), and then applying the estimated matrix to the second set of coordinates. As an example, the coordinate-change transform matrix may be estimated by performing a constraint-based least-squares, or least-mean-squares, adaptive estimation method, or other suitable method. Other techniques for converting or transforming localization coordinates into a common coordinate system may also be used.

Step 810 comprises determining, using the processor, a location of the second microphone array relative to the first microphone array (e.g., as represented by the dotted line arrow in FIG. 9) based on the transformed set of coordinates and/or the coordinate-change transform matrix estimated at step 808. For example, the transform matrix may be used to derive a distance between the second microphone array and the first microphone array, a position of the second microphone array relative to the first microphone array, and/or a rotation angle of the second microphone array relative to the first microphone array. Thus, the location of the second microphone array can be triangulated or determined based on the location of the first microphone array and time-synchronized sound localization data received from both arrays for the same audio source.

In embodiments, steps 802 to 810 may be iteratively repeated as new time-synchronized coordinates, or pairs of location points, are received at the processor, or until a convergence is reached, wherein the estimated triangulation error is less than a predefined threshold.

In some embodiments, process 800 further includes, at step 812, determining a distance between the second microphone array and a given audio pick-up region based on the relative location of the second microphone array, and based on said distance, determining a proximity of the second microphone array to the given audio pick-up region. For example, step 812 may be used to determine the proximity of the second microphone array to the second audio pick-up region in step 512 of process 500. In various embodiments, once the position of the second microphone array within the common coordinate system is determined, the distance between the second microphone array and the given audio pick-up region can be compared to the distance between the first microphone array and the same audio pick-up region. This comparison can then be used to determine which microphone array is in closer proximity to the audio pick-up region for microphone assignment purposes, as in steps 510 and 512 of process 500.

Thus, process 800 can provide automatic triangulation of microphone array positions in a room, which may be used to perform automatic setup of audio coverage areas, for example, as shown in FIG. 5 and described herein. The process 800 may be used during room installation, for example, to automatically discover the locations of the microphone arrays, instead of requiring an installer measure the precise locations of each array.

In some cases, the process 800 can be used to improve the localization performance and accuracy of the audio system, for example, as further described below with reference to FIGS. 10 through 12. As an example, in situations where the relative positions of two or microphone arrays are known, simultaneous localization data may be collected from those arrays and used to determine or derive a coordinate-change transform matrix between the coordinate systems of the arrays. This coordinate-change transform matrix may then be used to determine the position of, for example, a second microphone array within the coordinate system of a first microphone array and/or convert the localization coordinates obtained by the second microphone array into the coordinate system of the first microphone array (or vice versa). Using a common coordinate system to represent the positions of the arrays and the localization coordinates obtained by each array enables the one or more processors to perform various techniques for improving the performance and accuracy of the audio system, including, for example, identify and/or reduce localization error of the audio sources, improve localization accuracy of the audio sources, and/or determine if any of the sound localizations are erroneous or spurious and therefore, should be discarded. For example, two localization points simultaneously obtained by the first and second microphone arrays, respectively, may be deemed inaccurate localizations, and thus, discarded as outliers, if the two points are separated by more than a threshold distance (e.g., 20 cm, etc.), or have azimuth or elevation angles that are off by, or have a difference of, more than a threshold number of degrees (e.g., 10 degrees, 15 degrees, etc.).

In some embodiments, the process 800 may be used to improve an accuracy of the location of a given audio source. For example, in cases where automatic triangulation techniques are used to estimate the relative positions of the microphone arrays, there may be a margin of error in the azimuth, elevation, and/or radius information obtained for an audio source by a given microphone array due to the aperture size of the microphone array. This margin of error may cause, for example, the estimated distance between the audio source and the microphone array to be inaccurate. Accordingly, in various embodiments, the one or more processors may be configured to triangulate, or determine a more precise location for, the audio source by combining multiple localization coordinates obtained for the same audio source by different microphone arrays, after the coordinates have been transformed to the same coordinate system. In such embodiments, the process 800 may further include determining, or refining, a location of a given audio source relative to the first microphone array (e.g., array 902 in FIG. 9) based on a first set of localization coordinates obtained by the first microphone array for the first audio source and a transformed second set of localization coordinates, which were obtained by a second microphone array and transformed to the coordinate system of the first microphone array (e.g., to facilitate comparison of the different coordinates). For example, a more precise set of coordinates may be obtained for the audio source by combining (e.g., averaging, etc.) the first set of localization coordinates with the transformed second set of localization coordinates. In some embodiments, the one or more processors may also be configured to use the more precise locations of the audio sources to improve an accuracy of the relative locations of the microphone arrays, for example, by repeating one or more steps of the process 800 using the more precise location data for the audio sources.

In some embodiments, the automatic triangulation techniques described herein may be used to determine loudspeaker positions within an environment. For example, the position of a loudspeaker within a room may be determined based on sound localization data that is generated by a microphone array, or other audio input device comprising two or more microphones, within the same room, while far-end audio is played from the loudspeaker, for example, as shown in FIGS. 10 through 12. Loudspeaker positions may be determined during a set-up mode of the audio system, during an off-line adaptation mode based on historical data collected from the room, or during a live session or normal use mode of the audio system. The loudspeaker positions may be provided to the processor in order to aid the automatic audio coverage setup techniques described herein, for example, at step 506 of process 500. In some embodiments, upon determining the relative positions of the loudspeakers and microphones within an environment positions, each speaker may be grouped with an appropriate microphone array or other audio input device based on proximity in order to define a sound zone for use in voice-lift application or other sound reinforcement scenarios.

Figure 10:
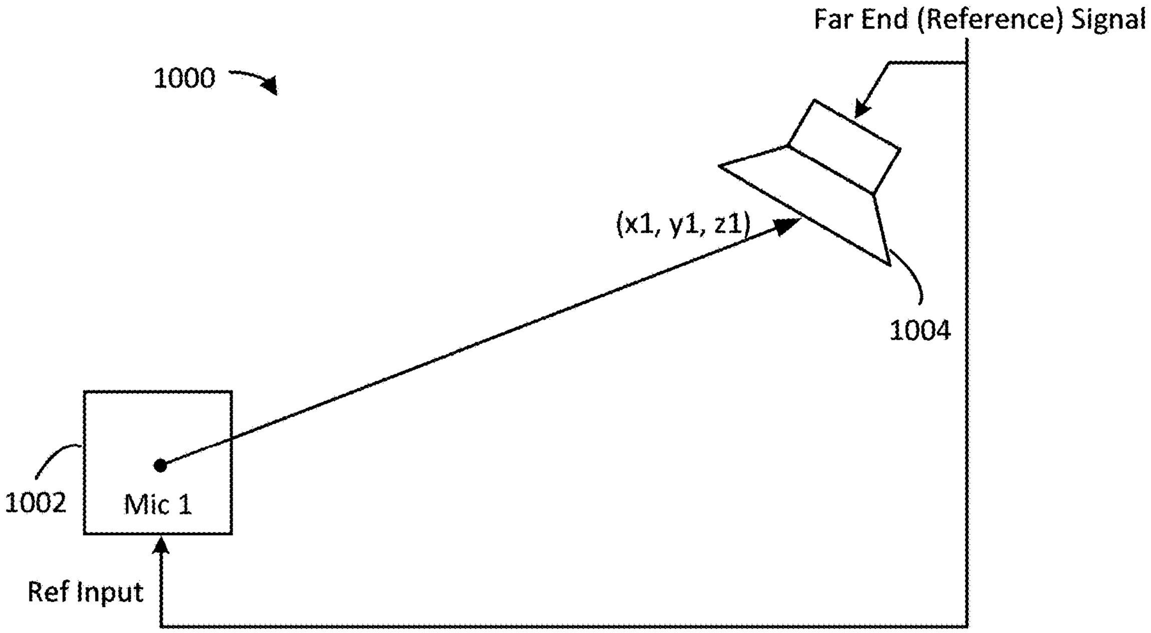
FIG. 10 is a schematic diagram illustrating an exemplary technique for determining the position of a loudspeaker relative to a microphone, in accordance with one or more embodiments.

Referring now to FIG. 10, shown is an exemplary technique for determining or triangulating the position of a loudspeaker relative to a microphone array, or other audio input device comprising two or more microphones, in accordance with embodiments. In particular, FIG. 10 depicts an environment 1000 comprising a microphone array 1002 and a loudspeaker 1004. As shown, a far-end signal is played by the loudspeaker 1004. In addition, the far-end signal is provided to the microphone array 1002 as a reference signal or input. The microphone array 1002 can be configured to localize an active audio source in the room (i.e. the loudspeaker 1004), while simultaneously detecting far-end signal activity in the form of a reference input. Using localization software, the microphone array 1002 may generate a set of coordinates (x1, y1, z1) to represent the position of the loudspeaker 1004 relative to the microphone array 1002. For example, as described herein, the localization software may be configured to calculate or determine a distance (e.g., Euclidean distance or the like) between the loudspeaker 1004 and the microphone array 1002 based on audio signals detected by the microphone array 1002, the audio signals representing playback of the far-end signal by the loudspeaker 1004, and determine the set of coordinates based on said distance. The accuracy of the loudspeaker position may be improved over time as more localization coordinates are received and analyzed, and any spurious or outlier localizations are rejected.

Figure 11:
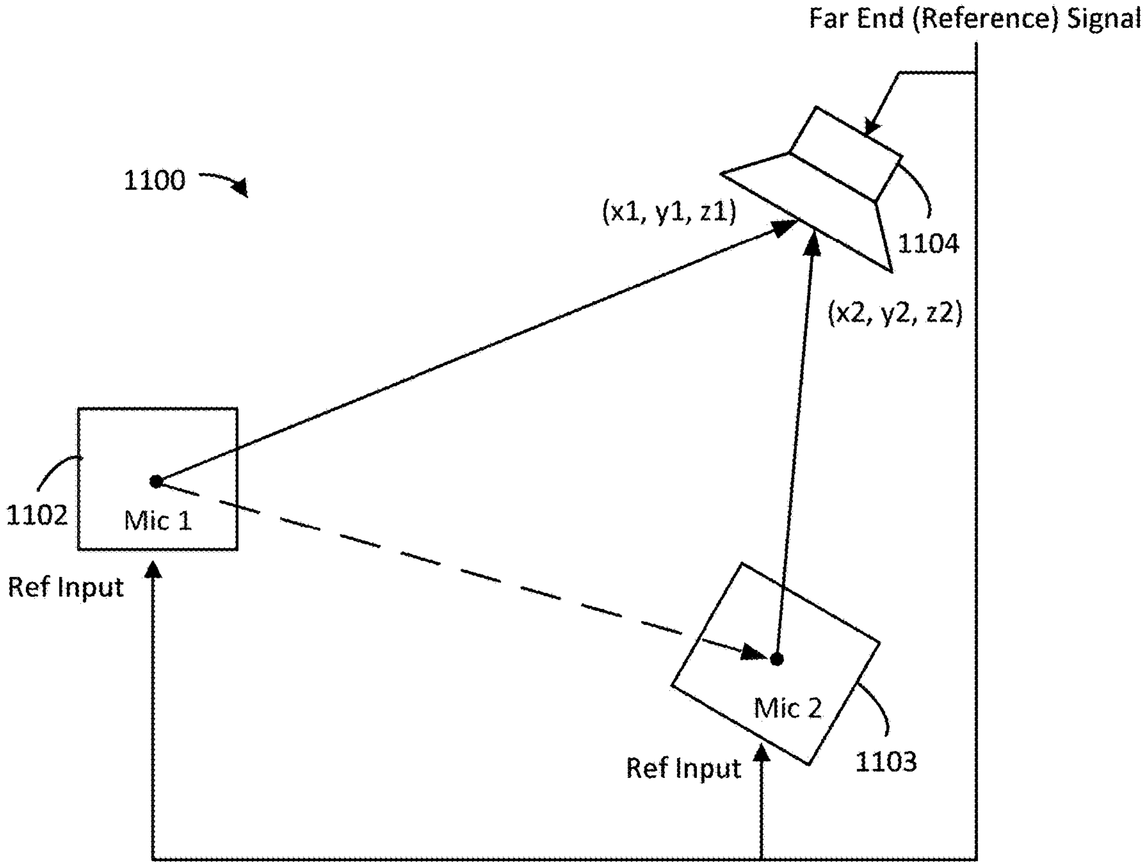
FIG. 11 is a schematic diagram illustrating an exemplary technique for determining the position of a loudspeaker using location data obtained from multiple microphones, in accordance with one or more embodiments.

Referring now to FIG. 11, shown is an exemplary technique for determining the position of a loudspeaker using location data obtained from multiple microphone arrays and/or other audio input devices comprising two or more microphones, in accordance with embodiments. In particular, FIG. 11 depicts an environment 1100 comprising a first microphone array 1102, a second microphone array 1103, and a loudspeaker 1104. As shown, a far-end signal is played by the loudspeaker 1104. In addition, the far-end signal is provided to each of the microphone arrays 1102 and 1103 as a reference signal or input.

At a first point in time (T1), the first microphone array 1102 can be configured to localize an active audio source in the room (e.g., the loudspeaker 1104), while simultaneously detecting far-end signal activity in the form of a reference input. This produces a first set of coordinates (x1, y1, z1) associated with the timestamp T1 that represents the position of the loudspeaker 1104 at time T1 relative to the first microphone array 1102. Simultaneously and independently, the second microphone array 1103 can be configured to localize the same active audio source (e.g., the loudspeaker 1104), while simultaneously detecting far-end signal activity in the form of a reference input. This produces a second set of coordinates (x2, y2, z2) associated with the timestamp T2 that represents the position of the loudspeaker 1104 at time T1 relative to the second microphone array 1103. The first and second microphone arrays 1102 and 1103 may use localization software to generate the coordinates, as described herein.

The position of the second microphone array 1103 relative to the first microphone array 1102 (e.g., as represented by the dotted line arrow in FIG. 11) may be previously known or may be automatically determined or triangulated using, for example, process 800 of FIG. 8. A coordinate-change transform matrix may then be used to convert the second set of coordinates to the coordinate system of the first microphone array, as described herein. Thus, the loudspeaker position may be provided in a common coordinate system. The accuracy of the loudspeaker position may be improved over time as more localization coordinates are received and analyzed, and any spurious or outlier localizations are rejected.

Figure 12:
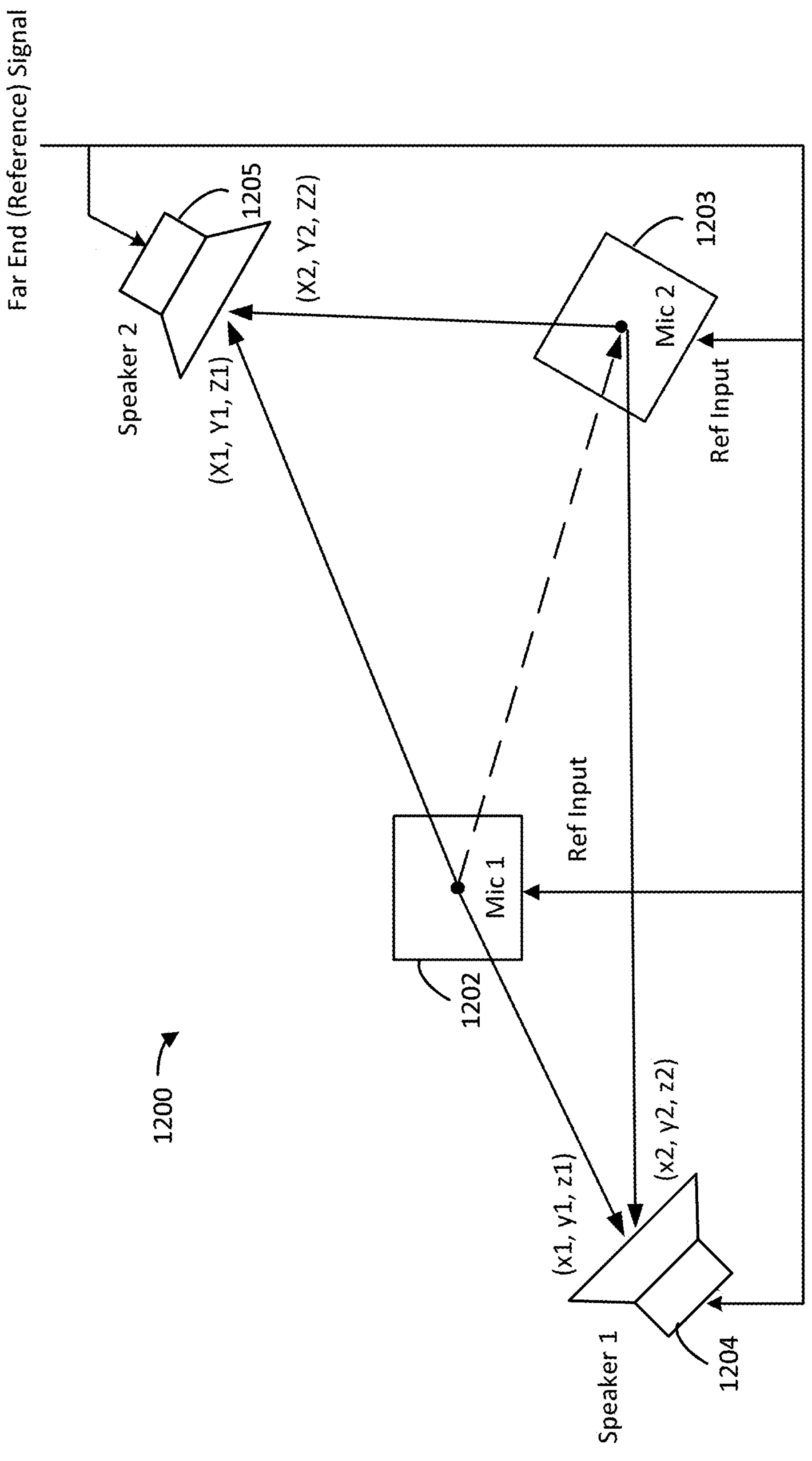
FIG. 12 is a schematic diagram illustrating an exemplary technique for determining the positions of multiple loudspeakers using location data obtained from multiple microphones, in accordance with one or more embodiments.

Referring now to FIG. 12, shown is an exemplary technique for determining the positions of multiple loudspeakers using location data obtained from multiple microphone arrays and/or other audio input devices comprising two or more microphones, in accordance with embodiments. In particular, FIG. 12 depicts an environment 1200 comprising a first microphone array 1202, a second microphone array 1203, a first loudspeaker 1204, and a second loudspeaker 1205.

In embodiments, during a setup mode, far-end signals may be played by the first and second loudspeakers 1204 and 1205, one at a time, while the same far-end signal is provided, as a reference signal or input, to each of the microphone arrays 1202 and 1203 and to the loudspeaker 1204 or 1205 that is not playing audio at that time. While the first loudspeaker 1204 is playing the far-end signal, the two microphone arrays 1202 and 1203 may be used to localize the first loudspeaker 1204 or determine sound localization coordinates for the first loudspeaker 1204, and the resulting coordinates may be used to estimate or triangulate the position of the first loudspeaker 1204 relative to the first array 1202, for example, using the techniques shown in FIG. 11 and described herein. For example, the first microphone array 1202 may produce a first set of coordinates (x1, y1, z1) to indicate a position of the first loudspeaker 1204 within a first coordinate system of the first microphone array 1202 during a playback of the far-end signal by the first loudspeaker 1204. At the same time, or nearly simultaneously, the second microphone array 1203 may produce a second set of coordinates (x2, y2, z2) to indicate a position of the first loudspeaker 1204 within a second coordinate system of the second microphone array 1203. This localization process may be repeated during playback of the far-end signal by the second loudspeaker 1205 in order to determine or triangulate the position of the second loudspeaker 1205 relative to the second array 1203 using the same techniques. For example, the first microphone array 1202 may produce a third set of coordinates (X1, Y1, Z1) to indicate a position of the second loudspeaker 1205 within the first coordinate system of the first microphone array 1202, and the second microphone array 1203 may produce a fourth set of coordinates (X2, Y2, Z2) to indicate a position of the second loudspeaker 1205 within the second coordinate system of the second microphone array 1203. The first and second microphone arrays 1202 and 1203 may use localization software to generate the coordinates, as described herein.

In some cases, such as, for example, after the setup mode (i.e. during a long term adaptation mode or during a normal use mode of the audio system), each of the microphone arrays 1202 and 1203 may localize a different one of the loudspeakers 1204 and 1205, such as, for example, the loudspeaker that is closer to the location of the particular microphone array. For example, at a first point in time (T1), the first microphone array 1202 may localize an active audio source in the room (i.e. the first loudspeaker 1204), while simultaneously detecting far-end signal activity in the form of a reference input, for example, using the same techniques as in FIG. 11. This produces a first set of coordinates associated with the timestamp T1, e.g., (x1, y1, z1, T1), that represents the position of the first loudspeaker 1204 at time T1 relative to the first microphone array 1202. At a second point in time (T2), the second microphone array 1203 may localize another active audio source in the room (i.e. the second loudspeaker 1205), while simultaneously detecting far-end signal activity in the form of a reference input, for example, using the same techniques as in FIG. 11. This produces a second set of coordinates associated with the timestamp T2, e.g., (X2, Y2, Z2, T2), that represents the position of the second loudspeaker 1205 at time T2 relative to the second microphone array 1203.

The position of the second microphone array 1203 relative to the first microphone array 1202 may be previously known or may have been automatically determined or triangulated during set-up mode and/or using, for example, process 800 of FIG. 8. A coordinate-change transform matrix may then be used to convert the second set of coordinates (x2, y2, z2) for the second loudspeaker 1205 to the coordinate system of the first microphone array 1202, as described herein. Thus, the position of the second loudspeaker 1205 may be provided in the same coordinate system as the position of the first loudspeaker 1204. The accuracy of the loudspeaker position may be improved over time as more localization coordinates are received and analyzed, and any spurious or outlier localizations are rejected.

FIGS. 13A to 13D illustrate an exemplary graphical user interface ("GUI") 1300 configured to be displayed on a display screen 1302 of an audio system (e.g., audio system 400 of FIG. 4) during a manual set-up or configuration mode of the audio system, in accordance with embodiments. The display screen 1302 may be included in, or connected to, a computing device of the audio system (e.g., computing device 114 of FIG. 1 or computing device 402 of FIG. 4). As shown, the GUI 1300 is configured to graphically represent an exemplary environment, such as, e.g., environment 1400 shown in FIGS. 14A to 14D. For example, the GUI 1300 includes a microphone icon 1304 that approximately corresponds to a position of a microphone array 1402 in the environment 1400. In some cases, the GUI 1300 may also include or show overall boundaries for the depicted environment that are selected based on, or proportional to, a size and shape of the actual environment 1400 (e.g., a room size and shape).

According to embodiments, the GUI 1300 is further configured to graphically and animatedly represent one or more audio pick-up regions (or audio coverage areas) using coverage icon(s) 1306 that correspondingly change in appearance as the audio pick-up regions are dynamically formed, in real time or near real time, using the process 500 shown in FIG. 5, or as otherwise described herein. In particular, FIGS. 13A to 13D show the GUI 1300 as a progression or series of animated images that sequentially transitions from one image to the next to show the formation and adaptation of one or more audio pick-up regions, using corresponding coverage icon(s) 1306, as one or more audio sources are detected and localized by the microphone array 1402. That is, each of the FIGS. 13A to 13D may represent the GUI 1300 at a particular point in time during the set-up procedure.

In embodiments, the GUI 1300 may be used by an installer (or user) during the set-up mode of the audio system to automatically create one or more audio pick-up regions at expected talker locations, or other selected locations in the environment 1400, as described herein. For example, FIGS. 14A to 14D show the environment 1400 as having a table 1404 (e.g., similar to table 104 in FIG. 1) with a plurality of chairs 1406 (e.g., similar to chairs 102 in FIG. 1) distributed around it and microphone array 1402 disposed on or above the table 1404. Assuming that the talkers will be seated at the table 1404, the installer may create one or more audio pick-up regions centered on the chairs 1406 by producing a sound (e.g., voice or speech audio) or other stimulus while standing, or positioned at, each of the chairs 1406, or otherwise moving around the table 1404. The sounds produced by the installer, or the audio source 1408, may be captured and localized by the microphone array 1402, and the corresponding localization coordinates may be provided to a processor (e.g., processor 410 of FIG. 4) to create appropriate audio pick-up region(s), for example, using the techniques described herein. As each audio pick-up region is defined, the processor may be configured to dynamically display or present a corresponding coverage icon 1306 on the GUI 1300 and dynamically update the icon 1306 on the GUI 1300 as the corresponding audio pick-up region is adjusted, for example, based on new localization data received in response to movement of the audio source 1408 to a new location.

Figure 13A:
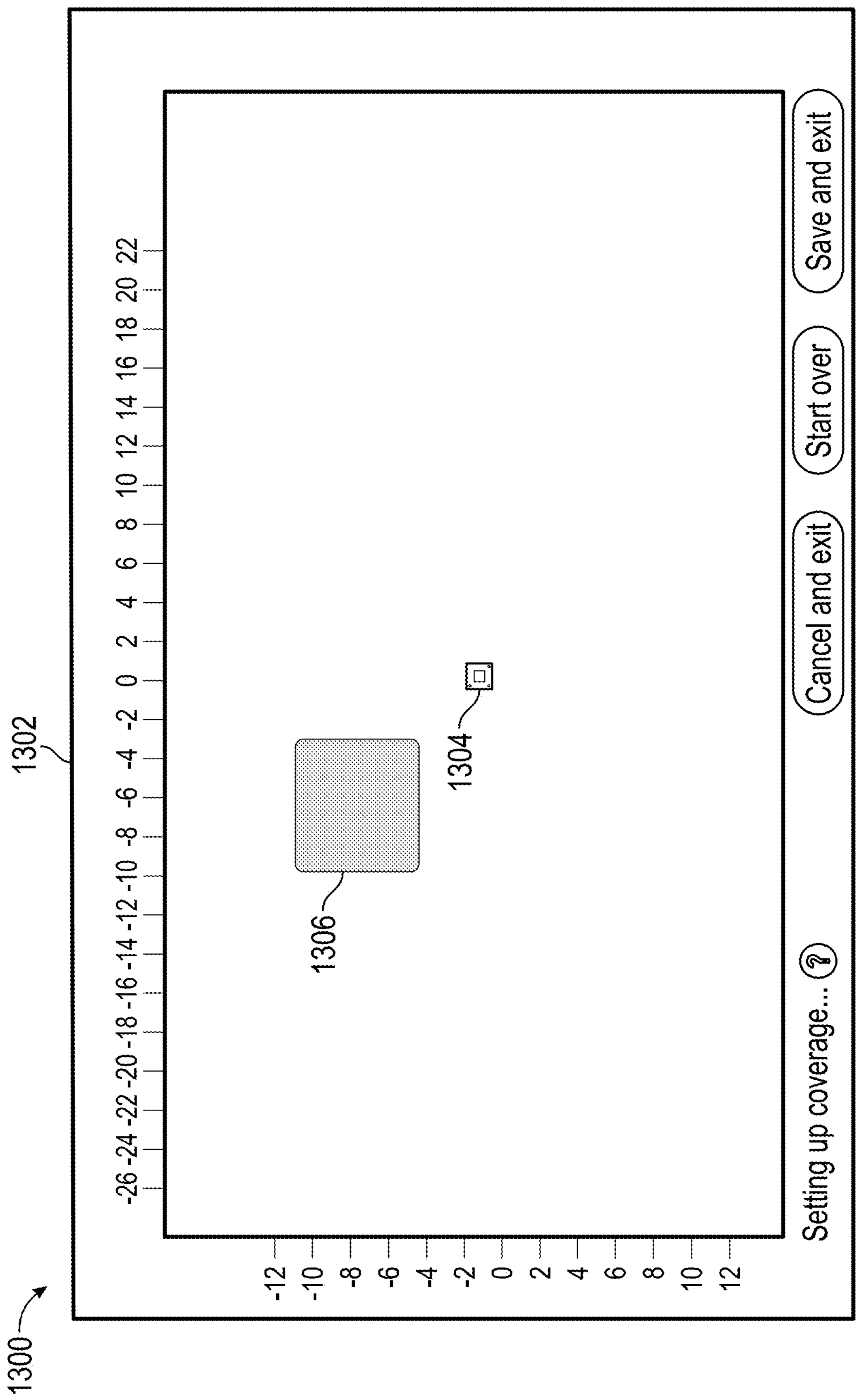
FIGS. 13A to 13D are screenshots of an exemplary graphical user interface for dynamically displaying creation and/or adjustment of one or more audio pick-up regions using the techniques described herein, in accordance with one or more embodiments.
Figure 13B:
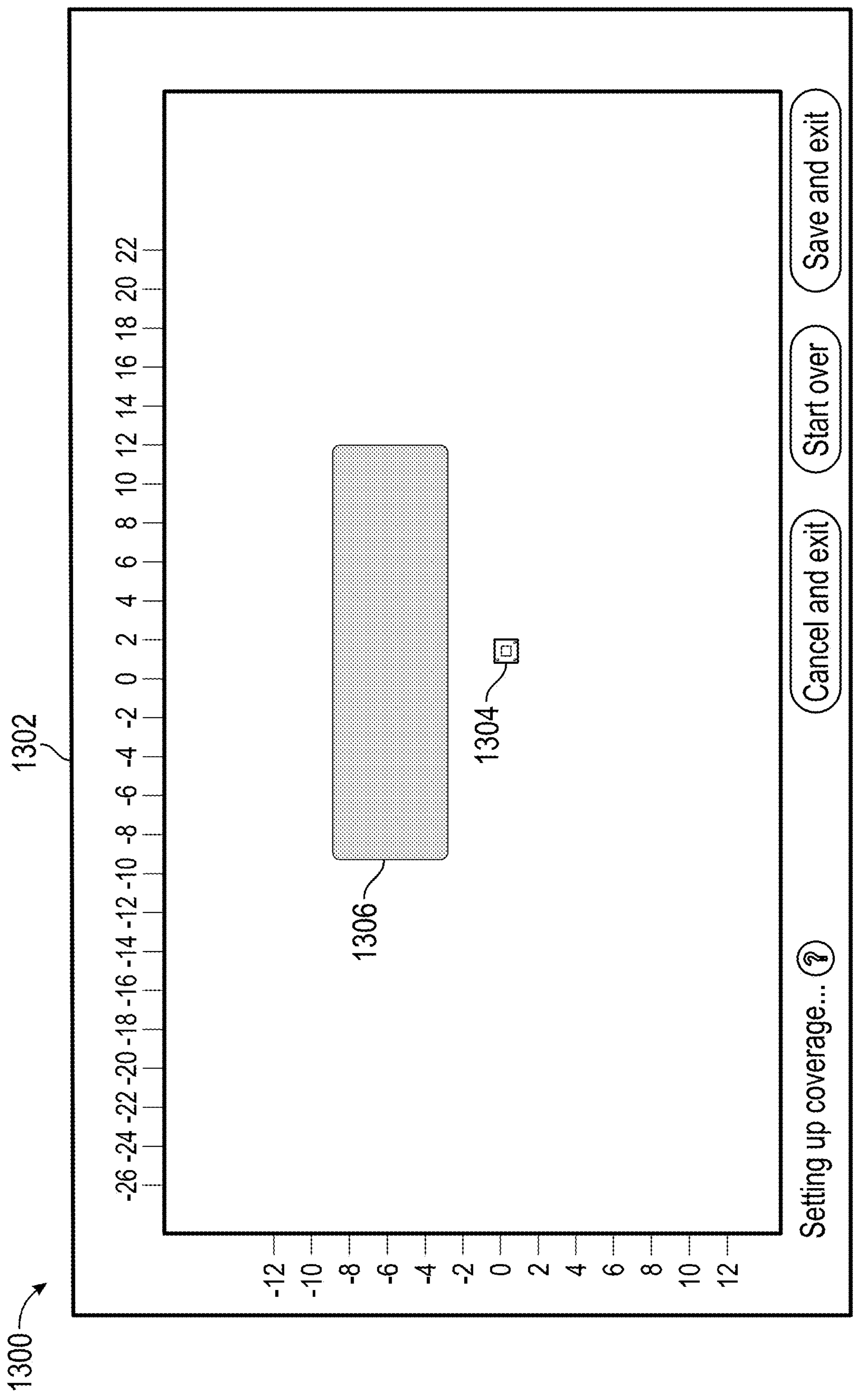
Figure 13C:
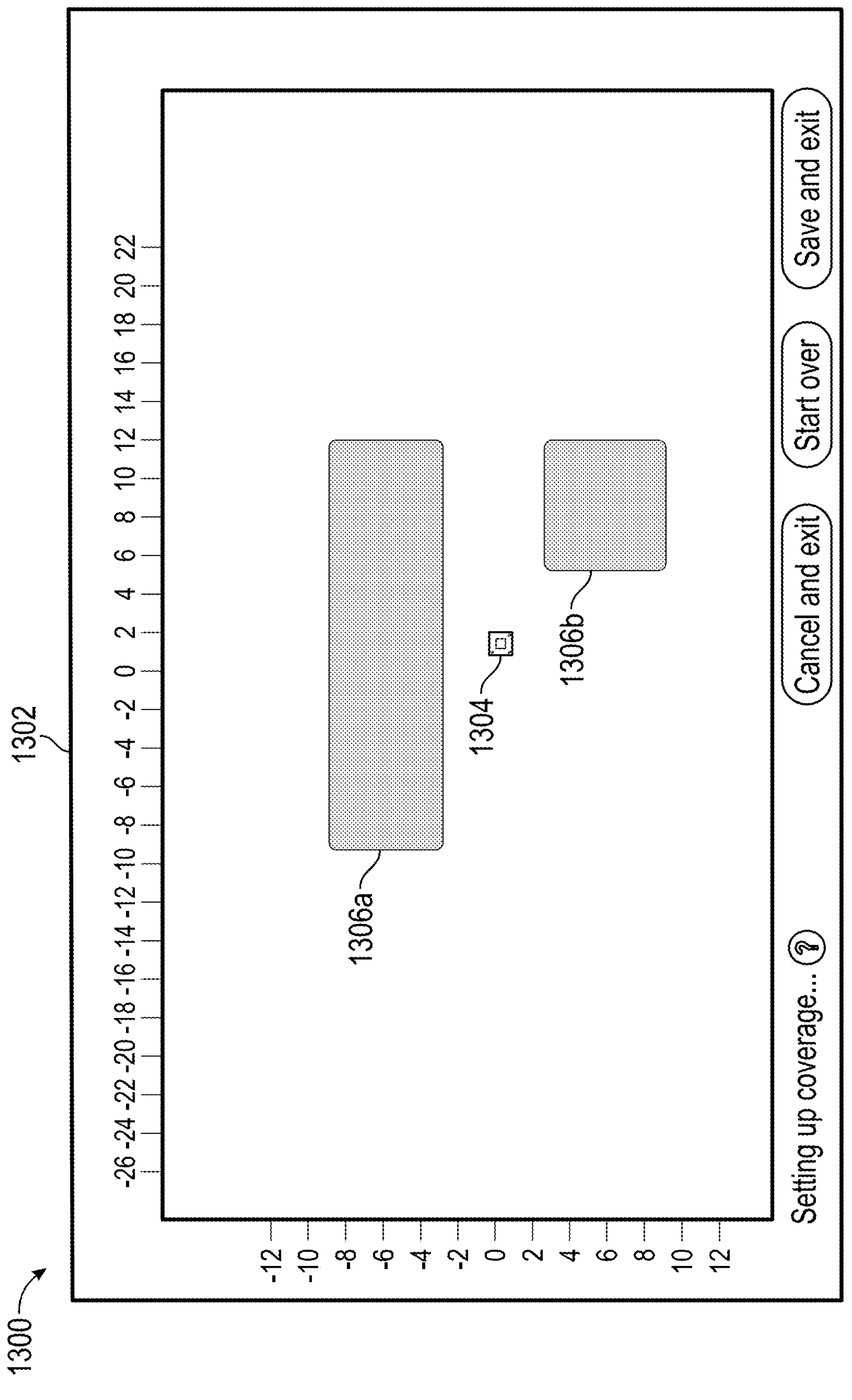
Figure 13D:
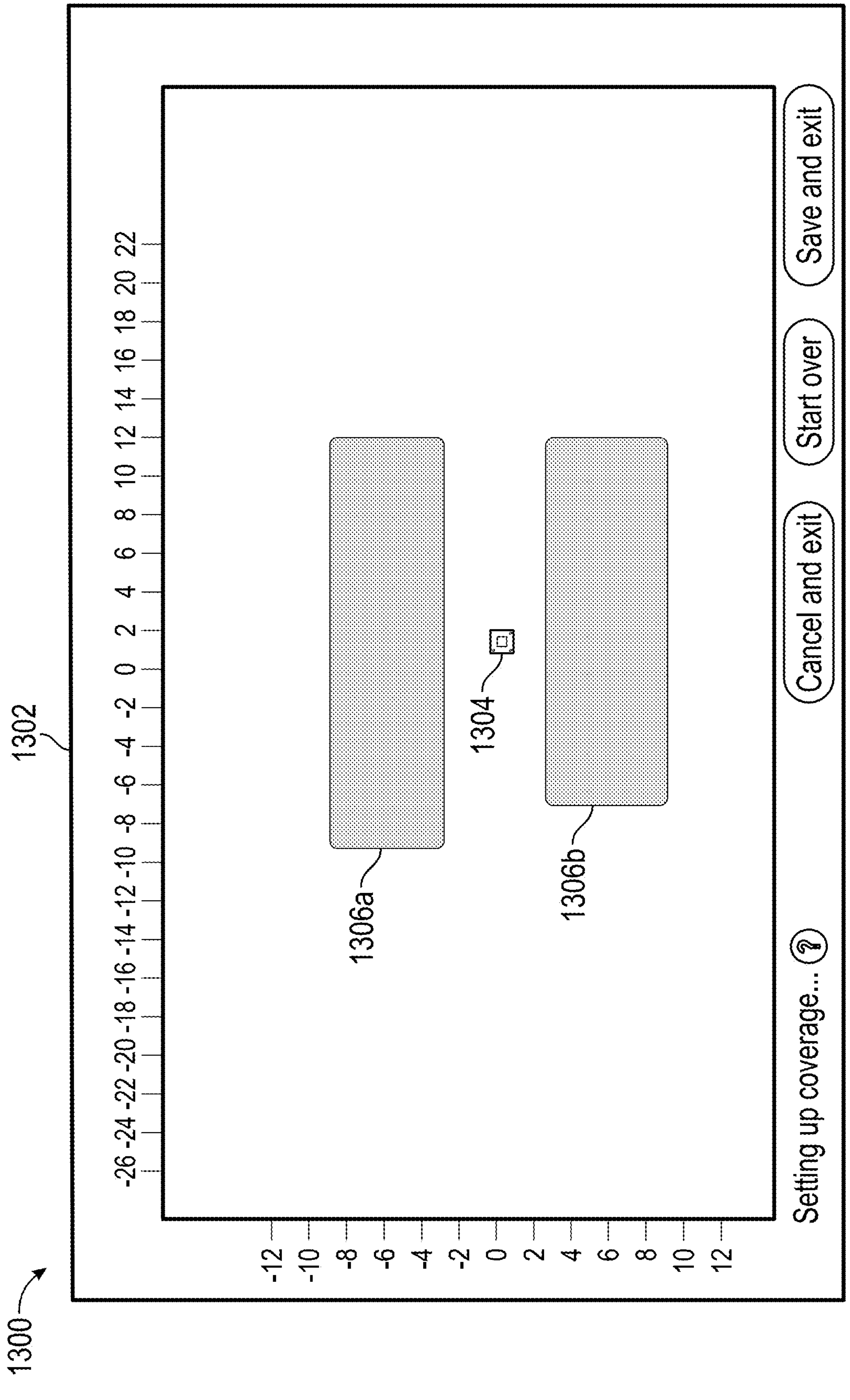
Figure 14A:
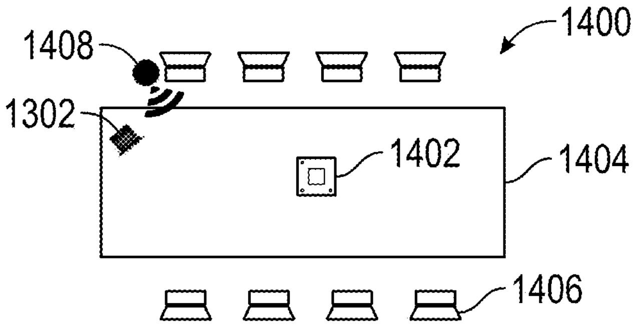
FIGS. 14A to 14D are schematic diagrams illustrating an exemplary environment and exemplary movement of an audio source about the environment during the creation and/or adjustment of the one or more audio pick-up regions in FIGS. 13A to 13D, respectively, in accordance with one or more embodiments.
Figure 14B:
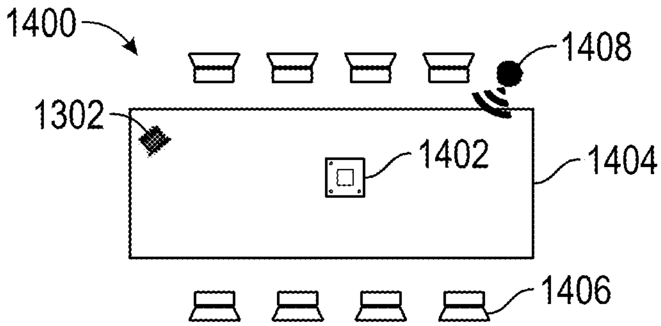
Figure 14C:
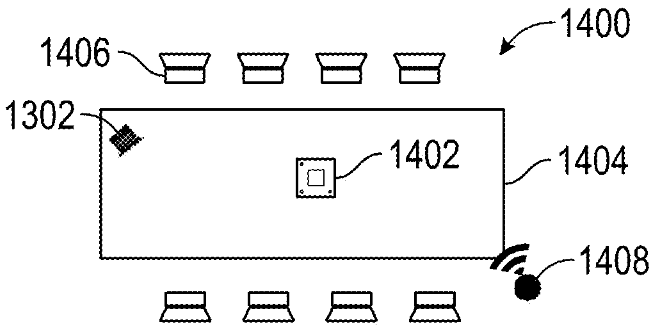
Figure 14D:
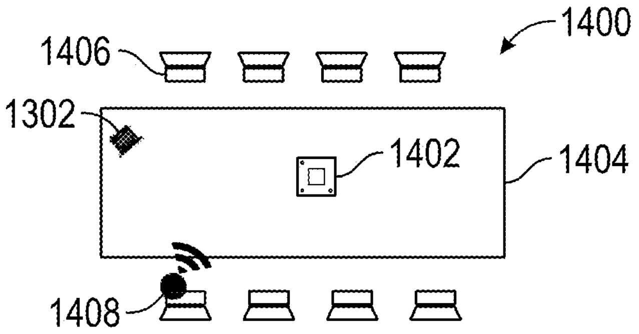

As an example, FIGS. 14A to 14D show an audio source 1408 (e.g., the installer) progressively moving around the table 1404, starting at a first chair 1406 at one corner of the table 1404 (e.g., FIG. 14A), moving along a first side of the table 1404 to a second chair 1406 at an opposite corner of the table 1404 (e.g., FIG. 14B), then moving across the table 1404 to a third chair 1406 on a second side of the table 1404 (e.g., FIG. 14C), and finally moving along the second side of the table 1404 to a fourth chair 1406 opposite the first chair 1406 (e.g., FIG. 14D). Relatedly, FIG. 13A shows the GUI 1300 with a single coverage icon 1306 in a square-like form that corresponds to a first audio pick-up region defined in response to detecting the audio source 1408 at the first chair 1406 (e.g., as shown in FIG. 14A). FIG. 13B shows the GUI 1300 with the coverage icon 1306 in an expanded or elongated rectangular form that corresponds to the adjustment or expansion of the first audio pick-up region to include all of the chairs 1406 on the first side of the table 1404, in response to detecting the audio source 1408 at the second chair 1406 (e.g., as shown in FIG. 14B). FIG. 13C shows the GUI 1300 with two coverage icons 1306*a* and 1306*b* on opposite sides of the microphone icon 1304, the first coverage icon 1306*a* being the same as the coverage icon 1306 shown in FIG. 13B for representing the first audio pick-up region. The second icon 1306*b* has a square-like form and corresponds to the addition of a second audio pick-up region on a second side of the table 1404, in response to detecting the audio source 1408 at the third chair 1406 (e.g., as shown in FIG. 14C). FIG. 13D shows the GUI 1300 with the same first coverage icon 1306*a* from FIG. 13C and with the second coverage icon 1306*b* in an expanded or elongated rectangular form, corresponding to expansion of the second audio pick-up region to include all of the chairs 1406 on the second side of the table 1404, in response to detecting the audio source 1408 at the fourth chair 1406 (e.g., as shown in FIG. 14D).

In some embodiments, the GUI 1300 may be interactive or otherwise configured to allow a user to manually refine or adjust a selected audio pick-up region, for example, by resizing, reshaping, moving, or otherwise changing a look and/or position of the corresponding coverage icon 1306, or by entering new values for one or more parameters of the selected audio pick-up region via a user interface of the computing device (e.g., user interface 416 of FIG. 4). In environments with multiple microphones (or microphone arrays), the GUI 1300 may also graphically link or connect each coverage icon 1306 to the assigned microphone, and in some cases, such microphone assignments may also be changed or re-arranged using the GUI 1300.

Referring back to FIG. 4, any of the processors described herein, such as, e.g., processor 410, may include a general purpose processor (e.g., a microprocessor) and/or a special purpose processor (e.g., an audio processor, a digital signal processor, etc.). In some examples, processor 410, and/or any other processor described herein, may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein, such as, e.g., memory 412, may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, memory 412, and/or any other memory described herein, includes multiple kinds of memory, particularly volatile memory and non-volatile memory.

Moreover, any of the memories described herein (e.g., memory 412) may be computer readable media on which one or more sets of instructions, such as the software for operating the techniques described herein, can be embedded. The instructions may reside completely, or at least partially, within any one or more of the memory, the computer readable medium, and/or within one or more processors (e.g., processor 410) during execution of the instructions. In some embodiments, memory 412, and/or any other memory described herein, may include one or more data storage devices configured for implementation of a persistent storage for data that needs to be stored and recalled by the end user, such as, e.g., location data received from one or more audio devices, prestored location data or coordinates indicating a known location of one or more audio devices, and more. In such cases, the data storage device(s) may save data in flash memory or other memory devices. In some embodiments, the data storage device(s) can be implemented using, for example, SQLite data base, UnQLite, Berkeley DB, BangDB, or the like.

In some embodiments, any of the computing devices described herein, such as, e.g., the computing device 402, may include one or more components configured to facilitate a conference call, meeting, classroom, or other event and/or process audio signals associated therewith to improve an audio quality of the event. For example, in various embodiments, the computing device 402, and/or any other computing device described herein, may comprise a digital signal processor ("DSP") configured to process the audio signals received from the various audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of audio processing techniques described herein, as will be appreciated.

Various components of the computing device 402, and/or any other computing device described herein, may be implemented in hardware (e.g., discrete logic circuits, application specific integrated circuits (ASIC), programmable gate arrays (PGA), field programmable gate arrays (FPGA), etc.), using software (e.g., program modules comprising software instructions executable by a processor), or through a combination of both. For example, some or all components of the computing device 402, and/or any other computing device described herein, may use discrete circuitry devices and/or use a processor (e.g., audio processor, digital signal processor, or other processor) executing program code stored in a memory, the program code being configured to carry out one or more processes or operations described herein. In embodiments, all or portions of the processes may be performed by one or more processors and/or other processing devices (e.g., analog to digital converters, encryption chips, etc.) within or external to the computing device 402. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the operations described herein. For example, in FIG. 4, program code stored in the memory 412 of the computing device 402 may be executed by the processor 410 of the computing device 402, by a separate digital signal processor coupled to or included in the computing device 402, or by a separate audio processor in order to carry out one or more of the operations described herein. In some embodiments, the program code may be a computer program stored on a non-transitory computer readable medium that is executable by a processor of the relevant device.

Moreover, the computing device 402, and/or any of the other computing devices described herein, may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory (e.g., memory 412) of the computing device and/or may be stored on a remote server (e.g., on premises or as part of a cloud computing network) and accessed by the computing device via a network connection. Some software applications may be configured as a distributed cloud-based software with one or more portions of the application residing in the computing device (e.g., computing device 402) and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device may be physically remote (e.g., a standalone microphone) and may be communicatively coupled to the computing device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIGS. 5 and 8, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

Further, it should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as is known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. The above description is intended to be taken as a whole and interpreted in accordance with the principles taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

Moreover, this disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, which may be amended during the pendency of the application for patent, and all equivalents thereof, when interpreted in accordance with the breadth to which they are fairly, legally and equitably entitled.

What is claimed is:

1. An audio system, comprising:

a plurality of microphones disposed in an environment, the plurality of microphones comprising a first subset of microphones and a second subset of microphones, wherein:

the first subset of microphones is configured to detect one or more audio sources, and generate first location data indicating a location of each of the one or more audio sources relative to the first subset of microphones, and the second subset of microphones is configured to detect the one or more audio sources, and generate second location data indicating the location of each of the one or more audio sources relative to the second subset of microphones; and at least one processor communicatively coupled to the plurality of microphones, wherein the at least one processor is configured to:

receive the first location data and the second location data from the plurality of microphones, define a plurality of audio pick-up regions in the environment based on the first location data and the second location data, the plurality of audio pick-up regions comprising a first audio pick-up region and a second audio pick-up region, assign the first audio pick-up region to the first subset of microphones based on a proximity of the first subset of microphones to the first audio pick-up region, the first subset of microphones being configured to deploy a first lobe within the first audio pick-up region, and assign the second audio pick-up region to the second subset of microphones based on a proximity of the second subset of microphones to the second audio pick-up region, the second subset of microphones being configured to deploy a second lobe within the second audio pick-up region, wherein the at least one processor is configured to define the plurality of audio pick-up regions by:

identifying clusters of adjacent location points within the received location data; and forming a respective one of the plurality of audio pick-up regions around each of the clusters.

2. The audio system of claim 1, wherein the one or more audio sources comprises a first audio source, and the first location data comprises a first set of coordinates for indicating the location of the first audio source relative to the first subset of microphones, and the second location data comprises a second set of coordinates for indicating the location of the first audio source relative to the second subset of microphones.

3. The audio system of claim 1, wherein each of the plurality of audio pick-up regions defines an area in which at least one of the one or more audio sources is located.

4. The audio system of claim 1, wherein the first audio pick-up region is located adjacent to the second audio pick-up region.

5. The audio system of claim 1, further comprising at least one audio speaker disposed in the environment, wherein the at least one processor is further configured to adjust a boundary of one or more of the plurality of audio pick-up regions based on a location of the at least one audio speaker.

6. The audio system of claim 1, wherein the at least one processor is further configured to adjust a boundary of one or more of the plurality of audio pick-up regions based on a location of at least one noise source.

7. The audio system of claim 1, wherein the at least one processor is further configured to adjust a boundary of one or more of the plurality of audio pick-up regions based on additional location data received from one or more of the plurality of microphones.

8. The method of claim 1, wherein the at least one processor is further configured to define the plurality of audio pick-up regions by:

identifying one or more outlier location points within at least one of the clusters; and removing the one or more outlier location points from the at least one of the clusters.

9. A method of automatically configuring audio coverage for an environment having a plurality of microphones communicatively coupled to at least one processor, the plurality of microphones including a first subset of microphones and a second subset of microphones, the method comprising:

receiving, with at least one processor, first location data from the first subset of microphones, the first location data indicating a location of each of one or more audio sources relative to the first subset of microphones;

receiving, with at least one processor, second location data from the second subset of microphones, the second location data indicating the location of each of the one or more audio sources relative to the second subset of microphones;

defining, with the at least one processor, a plurality of audio pick-up regions in the environment based on the first location data and the second location data, the plurality of audio pick-up regions comprising a first audio pick-up region and a second audio pick-up region;

assigning, with the at least one processor, the first audio pick-up region to the first subset of microphones based on a proximity of the first subset of microphones to the first audio pick-up region, the first subset of microphones being configured to deploy a first lobe within the first audio pick-up region; and assigning, with the at least one processor, the second audio pick-up region to the second subset of microphones based on a proximity of the second subset of microphones to the second audio pick-up region, the second subset of microphones being configured to deploy a second lobe within the second audio pick-up region, wherein defining the plurality of audio pick-up regions comprises:

identifying clusters of adjacent location points based on the first location data and the second location data; and forming a respective one of the plurality of audio pick-up regions around each of the clusters.

10. The method of claim 9, further comprising adjusting, with the at least one processor, a boundary of one or more of the plurality of audio pick-up regions based on a location of at least one audio speaker disposed in the environment.

11. The method of claim 9, further comprising adjusting, with the at least one processor, a boundary of one or more of the plurality of audio pick-up regions based on a location of at least one noise source.

12. The method of claim 9, further comprising adjusting, with the at least one processor, a boundary of one or more of the plurality of audio pick-up regions based on additional location data received from one or more of the plurality of microphones.

13. The method of claim 9, wherein defining the plurality of audio pick-up regions further comprises:

identifying one or more outlier location points within at least one of the clusters; and removing the one or more outlier location points from the at least one of the clusters.

14. An audio system, comprising:

a plurality of microphones disposed in an environment, wherein the plurality of microphones is configured to:

detect one or more audio sources, and generate location data indicating a location of each of the one or more audio sources relative to the plurality of microphones; and at least one processor communicatively coupled to the plurality of microphones, wherein the at least one processor is configured to:

receive the location data from the plurality of microphones, and define a plurality of audio pick-up regions in the environment based on the location data, the plurality of audio pick-up regions comprising a first audio pick-up region and a second audio pick-up region, wherein the plurality of microphones are configured to deploy a first lobe within the first audio pick-up region and a second lobe within the second audio pick-up region, wherein the at least one processor is configured to define the plurality of audio pick-up regions by:

identifying clusters of adjacent location points within the received location data; and forming a respective one of the plurality of audio pick-up regions around each of the clusters.

15. The audio system of claim 14, wherein the plurality of microphones is disposed in a microphone array.

16. The audio system of claim 14, wherein the at least one processor is further configured to:

identify one or more outlier location points within at least one of the clusters; and remove the one or more outlier location points from the at least one of the clusters.

17. The audio system of claim 14, further comprising at least one audio speaker disposed in the environment, wherein the at least one processor is further configured to adjust a boundary of one or more of the plurality of audio pick-up regions based on a location of the at least one audio speaker.

18. The audio system of claim 14, wherein the at least one processor is further configured to adjust a boundary of one or more of the plurality of audio pick-up regions based on a location of at least one noise source.

19. The audio system of claim 14, wherein the at least one processor is further configured to adjust a boundary of one or more of the plurality of audio pick-up regions based on additional location data received from one or more of the plurality of microphones.

20. The audio system of claim 14, wherein the first audio pick-up region is located adjacent to the second audio pick-up region.

* * * * *